(12) United States Patent
Hattori et al.

(10) Patent No.: US 7,331,652 B2
(45) Date of Patent: Feb. 19, 2008

(54) JOINT STRUCTURE AND METHOD OF PRODUCING SAME

(75) Inventors: Shingo Hattori, Tsushima (JP); Yoichiro Shimizu, Kasugai (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 230 days.

(21) Appl. No.: 10/855,162

(22) Filed: May 27, 2004

(65) Prior Publication Data

US 2004/0239733 A1 Dec. 2, 2004

(30) Foreign Application Priority Data

May 30, 2003 (JP) ............................. 2003-154306

(51) Int. Cl.
| | |
|---|---|
| *B41J 2/14* | (2006.01) |
| *B21D 53/76* | (2006.01) |
| *F16L 13/02* | (2006.01) |
| *B23K 20/12* | (2006.01) |
| *B29C 65/08* | (2006.01) |

(52) U.S. Cl. .................... 347/47; 29/890.1; 385/288.1; 403/270; 156/73.1

(58) Field of Classification Search .................. 347/47; 29/890.1; 285/288.1; 403/270; 156/73.1

See application file for complete search history.

(56) References Cited

U.S. PATENT DOCUMENTS

| | | | |
|---|---|---|---|
| 5,540,808 A * | 7/1996 | Vincent et al. .......... 156/580.2 |
| 6,066,216 A * | 5/2000 | Ruppel, Jr. ................ 156/73.1 |
| 6,604,817 B2 | 8/2003 | Isono et al. | |
| 6,969,164 B2 * | 11/2005 | Kerr et al. ..................... 347/86 |
| 6,974,207 B2 * | 12/2005 | Drummond et al. .......... 347/49 |
| 6,988,478 B2 * | 1/2006 | Tanikawa et al. ...... 123/184.42 |
| 7,121,643 B2 * | 10/2006 | Yamada ....................... 347/20 |
| 2004/0125183 A1* | 7/2004 | Lee et al. ...................... 347/86 |
| 2006/0048740 A1* | 3/2006 | Tanikawa et al. ...... 123/184.61 |

FOREIGN PATENT DOCUMENTS

| | | |
|---|---|---|
| JP | 62-234940 | 10/1987 |
| JP | 5-11071 | 1/1993 |
| JP | 2001-2467744 | 9/2001 |

* cited by examiner

*Primary Examiner*—Stephen Meier
*Assistant Examiner*—Rene Garcia, Jr.
(74) *Attorney, Agent, or Firm*—Day Pitney LLP

(57) ABSTRACT

A joint structure including a first member and a second member which are jointed to each other to define a flow passage in which a fluid flows. One of the first and second members includes a weldable portion which projects toward an opposed surface of the other of the first and second members in a first direction and whose end portion is fused and welded to the opposed surface, so as to joint the first and second members to each other at a first position in the first direction. One of the first and second members includes a first projecting portion which is provided between the weldable portion and the flow passage in a second direction perpendicular to the first direction, and projects toward the other of the first and second members such that a free end of the first projecting portion is located at a second position different from the first position in the first direction, while the first projecting portion cooperates with the weldable portion to define a first space therebetween in the second direction.

24 Claims, 18 Drawing Sheets

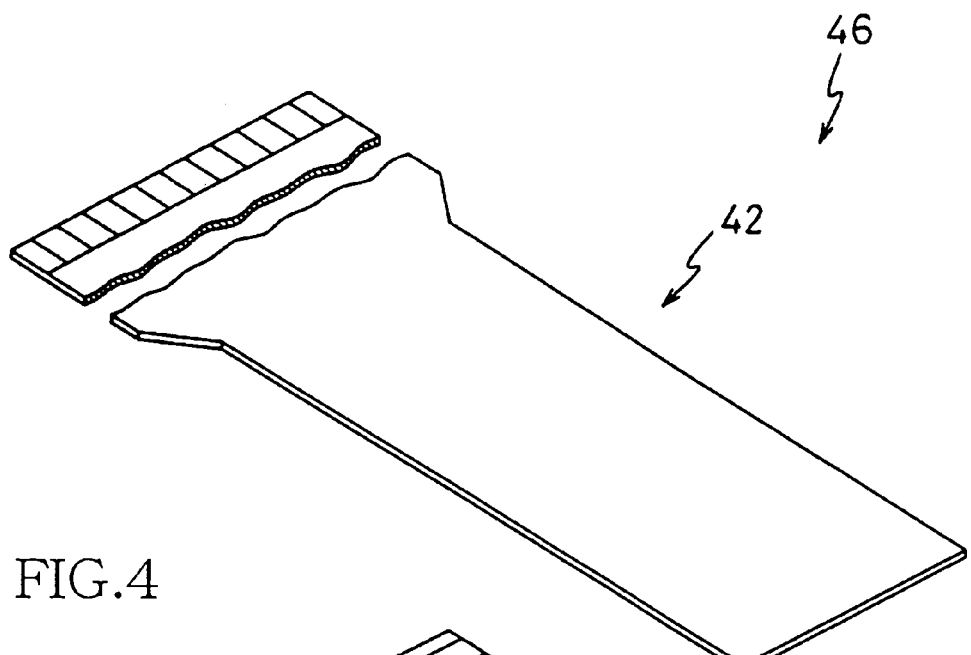
FIG.4
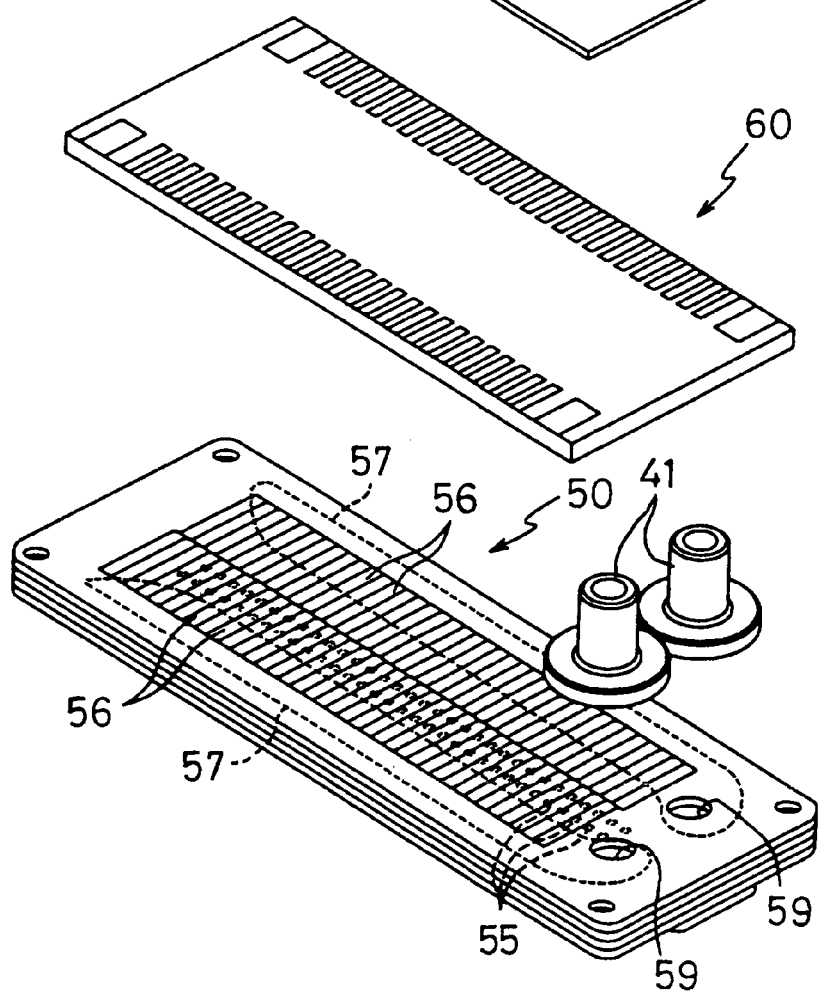

JOINT STRUCTURE AND METHOD OF PRODUCING SAME

The present application is based on Japanese Patent Application No. 2003-154306 filed on May 30, 2003, the contents of which are incorporated herein by reference.

BACKGROUND OF THE INVENTION

1. Field of the Invention

The present invention relates to a joint structure including a first member and a second member which are jointed to each other to define a flow passage in which a fluid flows, and a method of producing the joint structure.

2. Related Art Statement

There has conventionally been known an ink jet printer head including plastic members which are jointed to each other by utilizing supersonic wave. This printer head is disclosed by, e.g., Patent Document 1 (Japanese Patent Publication No. 62-234940). In the joint structure disclosed by Patent Document 1, a plastic substrate which has an ink flow passage, and a plastic ink tank which stores ink are jointed, by supersonic welding, to each other, and the ink tank has a flush trap, i.e., a groove which prevents burrs produced by the supersonic welding, from entering an inner space thereof.

In addition, there is known a joint structure in which a display panel is jointed, by supersonic welding, to a housing case. This structure is disclosed by, e.g., Patent Document 2 (Japanese Patent Publication No. 5-11071). In the joint structure disclosed by Patent Document 2, the housing case has, at a location radially inward of a weldable portion of the display panel (i.e., an outer peripheral portion of the same), a relief groove which accommodates and hides fused burrs produced by the supersonic welding.

SUMMARY OF THE INVENTION

However, in the joint structure disclosed by Patent Document 1, the flush trap is defined by a groove formed in an end portion of the ink tank at a position radially inward of a weldable portion thereof to be welded by supersonic wave, and a surface of the plastic substrate that is opposed to the end portion of the ink tank is flat. Therefore, the weldable portion is fused by the supersonic welding, and the fused plastic material might flow along the plastic substrate and enter the inner space of the ink tank. In addition, the joint structure disclosed by Patent Document 1 relates to the art of supersonic welding of the ink tank and the plastic substrate, but does not relate to a joint structure in which two members are jointed to each other to define a flow passage in which a fluid flows and which prevents a fused material from flowing into the flow passage.

Moreover, in the joint structure disclosed by Patent Document 2, it is required, in view of the nature of the display panel, that the fused burrs produced by the supersonic welding be fully invisible from the outside. To this end, an outer peripheral, annular projection of the display panel is closely and forcibly fitted in a main groove of the housing case, so that the fused plastic material is accommodated by the relief groove formed in the inner bottom surface of the main groove. Thus, it is difficult to position accurately the display panel relative to the housing case. Thus, Patent Document 2 does not relate to a joint structure in which two members are jointed to each other to define a flow passage having a prescribed cross section.

It is therefore an object of the present invention to provide a joint structure and a method of producing the same each of which is freed of at least one of the above-identified problems. It is another object of the present invention to provide a joint structure in which first and second members are jointed to each other to define a flow passage in which a fluid flows, and a method of producing the same, each of which can effectively prevent a fused material of at least one of the first and second members from flowing into the flow passage.

According to a first aspect of the present invention, there is provided a joint structure comprising a first member and a second member which are jointed to each other to define a flow passage in which a fluid flows. At least one of the first and second members includes a weldable portion which projects toward an opposed surface of an other of the first and second members in a first direction and whose end portion is fused and welded to the opposed surface, so as to joint the first and second members to each other at a first position in the first direction. At least one of the first and second members includes a first projecting portion which is provided between the weldable portion and the flow passage in a second direction perpendicular to the first direction, and projects toward an other of the first and second members such that a free end of the first projecting portion is located at a second position different from the first position in the first direction, while the first projecting portion cooperates with the weldable portion to define a first space therebetween in the second direction.

In the joint structure according to the first aspect of the present invention, the second position is different from the first position in the first direction. Therefore, although, when the weldable portion is welded, the end portion of the weldable portion is fused at the first position and the fused material may flow from the first position, the flowing of the fused material is blocked by the first projecting portion, and the fused material is accumulated in the first space. Thus, when the first and second members are jointed to each other to define the flow passage in which the fluid flows, the fused material can be effectively prevented from flowing into the flow passage and thereby decreasing a cross-section area of the same.

According to a second aspect of the present invention, there is provided a method of producing a joint structure including a first member and a second member, the method comprising the steps of preparing the first and second members; and joining the first and second members to each other to define a flow passage in which a fluid flows. The step of preparing comprises forming a weldable portion which projects from at least one of the first and second members toward an opposed surface of an other of the first and second members in a first direction and whose end portion is fused and welded to the opposed surface so as to joint the first and second members to each other at a first position in the first direction, and a first projecting portion which is provided between the flow passage and the weldable portion in a second direction perpendicular to the first direction, and which projects from at least one of the first and second members toward an other of the first and second members such that a free end of the first projecting portion is located at a second position different from the first position in the first direction, while the first projecting portion cooperates with the weldable portion to define a space therebetween in the second direction. The step of jointing comprises positioning the first and second members relative to each other in the first and second directions, such that the end portion of the weldable portion contacts the opposed surface, and welding the weldable portion to the opposed surface by supplying a supersonic energy to the end portion of the weldable portion and thereby fusing the end portion, while moving at least one of the first and second members toward an other of the first ad second members in the first direction.

In the joint-structure producing method according to the second aspect of the present invention, the second position is different from the first position in the first direction. Therefore, although, in the welding step, the end portion of the weldable portion is fused at the first position and the fused material may flow from the first position, the flowing of the fused material is blocked by the first projecting portion, and the fused material is accumulated in the first space. Thus, when the joint structure is produced by jointing the first and second members to each other to define the flow passage in which the fluid flows, the fused material can be effectively prevented from flowing into the flow passage and thereby decreasing a cross-section area of the same.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4 is an exploded, perspective view of one of four ink ejector units of the recording head;

DETAILED DESCRIPTION OF THE PREFERRED EMBODIMENTS

Hereinafter, there will be described preferred embodiments of the present invention by reference to the drawings. The present invention is widely applicable to various sorts of joint structures each of which includes a first member and a second member which are jointed to each other to define a flow passage in which a fluid can flow.

A first embodiment relates to a joint structure employed by a recording head 63 (FIG. 2) of a full-color ink jet printer 100 (FIG. 1), wherein an ink corresponds to the fluid and an ink supply passage 44 (FIG. 2) which supplies the ink to each of a plurality of ink ejection nozzles 55 (FIG. 4) of the recording head 63, corresponds to the flow passage defined by the first and second members jointed to each other.

Figure 1:
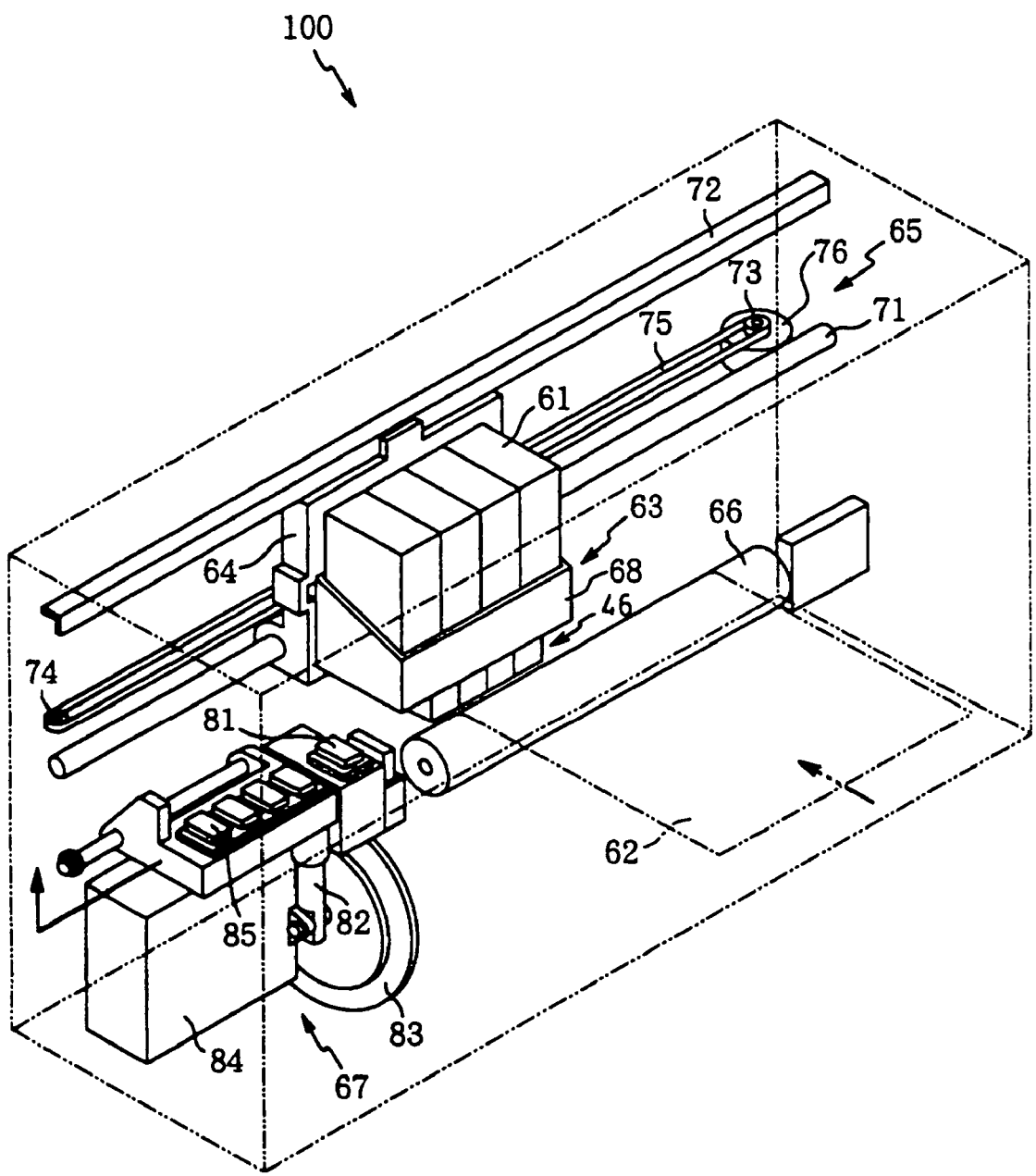
FIG. 1 is a perspective view of an ink jet printer to which the present invention is applied.

First, the full-color ink jet printer 100 employing the joint structure according to the present invention is briefly described, by reference to FIG. 1. As shown in the figure, the ink jet printer 100 includes the recording head 63. The recording head 63 includes a frame member 68; four piezoelectric ink ejector units 46 which eject four color inks (i.e., cyan, magenta, yellow, and black inks), respectively, and are fixed to the frame member 68; and four ink cartridges 61 which store the four color inks, respectively, and are detachably attached to the frame member 68. The frame member 68 is fixed to a carriage 64. The carriage 64 is driven by a drive device 65, so that the carriage 64 is linearly reciprocated along an axis line of a platen roller 66 which is opposed to the ink ejector units 46. The platen roller 66 is rotated about the axis line so as to feed a recording sheet 62 as a sort of recording medium. Each of the ink ejector units 46 has the plurality of ink ejection nozzles 55 each of which ejects a droplet of ink toward the recording sheet 62.

The carriage 64 is slideably supported by a guide bar 71 and a guide plate 72 each of which extends parallel to the axis line of the platen roller 66. The drive device 65 includes an endless belt 75 to which the carriage 64 is fixed; two pulleys 73, 74 on which the endless belt 75 is wound; and an electric motor 76 which drives or rotates one 73 of the two pulleys 73, 74 and thereby reciprocates the carriage 64.

A purging device 67 is for forcibly sucking, and thereby removing, bad ink containing air bubbles and/or dust remaining in the recording head 63. The purging device 67 includes a cam 83; a purging cap 81 which is driven by the cam 83 so as to cover the nozzles 55 opening in a lower surface of each one of the ink ejector units 46; and a pump 85 which sucks the bad ink containing the air bubbles and the dust remaining in the each ink ejector unit 46 and discards the sucked ink into a waste ink container 84. In FIG. 1, reference numeral 85 designates four cap members which cover, when the carriage 64 is returned to a reset position after a recording operation, the respective groups of nozzles 55 of the four ink ejector units 46, and thereby prevent the inks from drying up.

Figure 2:
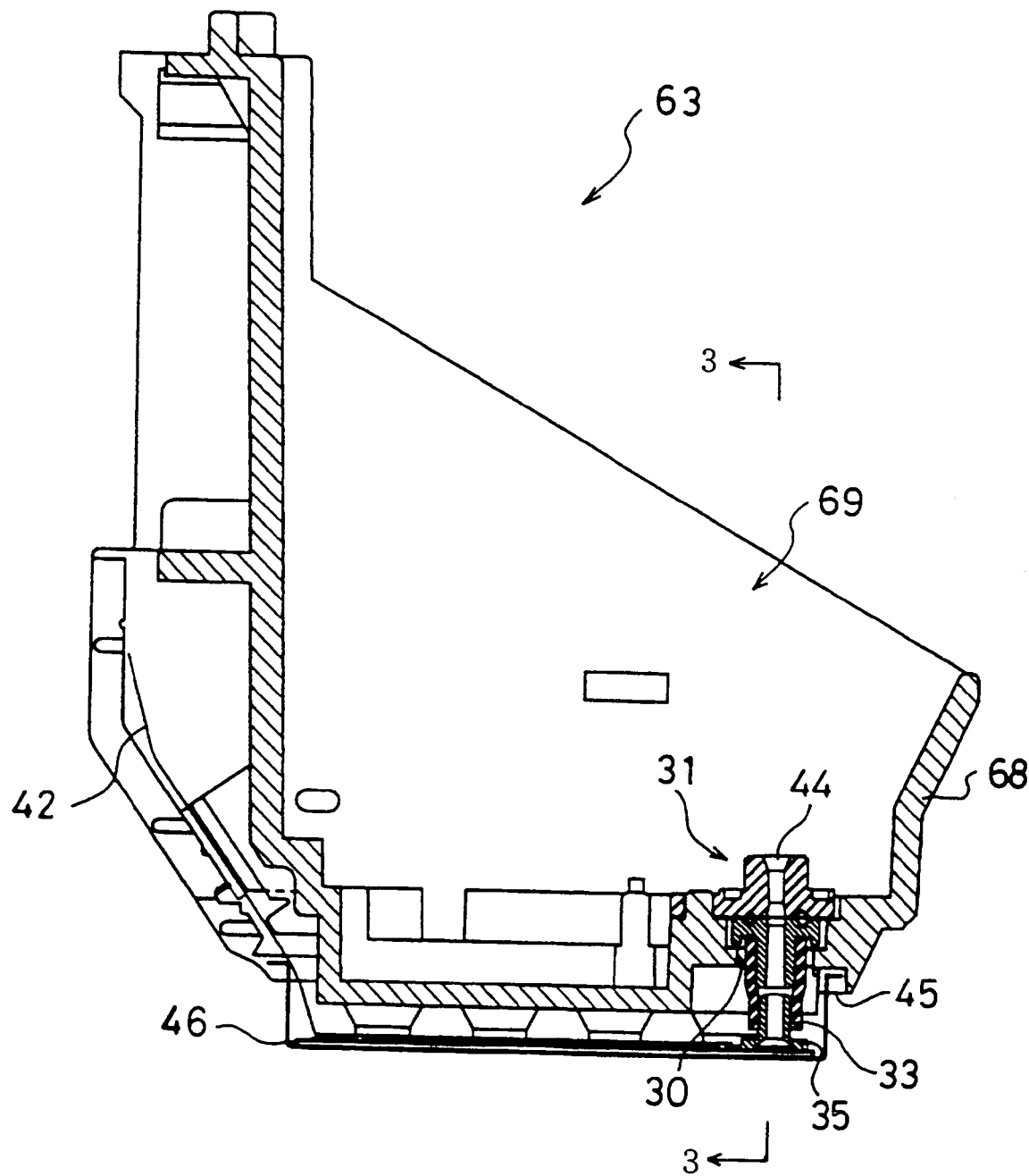
FIG. 2 is a cross-section view of a recording head of the ink jet printer.

Next, the recording head 63 will be described by reference to FIGS. 2 and 3. The frame member 68 of the recording head 63 has a generally box-like configuration opening upward, and includes a support portion 69 which supports the four ink cartridges 61 such that each of the ink cartridges 61 is detachably attached to the support portion 69 through the upper opening of the frame member 68. The frame member 68 has a bottom wall 45 to a lower surface of which the four ink ejector units 46 are fixed in an array. The four ink ejector units 46 and the four ink cartridges 61 are connected to each other via four ink supply passages 44, respectively.

Next, the ink ejector units 46 each of which has the same construction as disclosed by Japanese Patent Publication No. 2001-246744 and its corresponding U.S. Pat. No. 6,604,817 will be described by reference to FIG. 4. Each ink ejector unit 46 includes a cavity plate 50 which is constituted by a plurality of thin metallic sheets stacked on each other; and a plate-type piezoelectric actuator 60 which is stacked, and bonded, on and to, the cavity plate 50 with an adhesive agent or via an adhesive sheet. The ink ejector unit 46 additionally includes a flexible flat cable 42 which is bonded to an upper surface of the piezoelectric actuator 60 with an adhesive agent, so that the piezoelectric actuator 60 is electrically connected to an external device, not shown.

The cavity plate 50 has the plurality of ink ejection nozzles 55 that open in the lower surface of the plate 50 and are arranged in two arrays. Each of the nozzles 55 ejects a droplet of ink in a downward direction. The cavity plate 50 has, in an upper surface thereof, a number of pressure chambers 56 that are arranged in two arrays and communicate with the nozzles 55 via respective communication holes, not shown, formed in the plate 50.

The piezoelectric actuator 60 has the same construction as disclosed by the above-indicated document, and accordingly is not shown in detail. In short, the piezoelectric actuator 60 has a known construction including a plurality of drive electrodes which correspond to the pressure chambers 56 of the cavity plate 50, respectively; a common electrode which is common to all the pressure chambers 56; and a piezoelectric sheet which is sandwiched by the drive electrodes and the common electrode. When an electric voltage is applied to an arbitrary one of the drive electrodes, and the common electrode, a corresponding portion of the piezoelectric sheet is deformed so that a volume of a corresponding one of the pressure chambers 56 is decreased and accordingly a droplet of ink is ejected from a corresponding one of the nozzles 55.

The cavity plate 50 has two common ink manifolds 57, 57 which are for delivering ink to each of the pressure chambers 56; and two ink supply inlets 59, 59 which communicate with the two ink manifolds 57, respectively and open in the upper surface of the plate 50. The two ink supply inlets 59 are provided with respective metallic tubular members 41, 41 which are bonded to the upper surface of the cavity plate 50 with an adhesive agent (e.g., an epoxy resin adhesive). Each of the two tubular members 41 projects from the cavity plate 50 toward the frame member 68, and an inner space of the each tubular member 41 communicates with a corresponding one of the ink supply inlets 59.

Hereinafter, there will be described the ink supply passages 44 (hereinafter, referred to as the "flow passages" 44) each of which communicates a corresponding one of the ink cartridges 61 and a corresponding one of the ink ejector units 46 with each other, so that a corresponding one of the color inks each as the fluid can flow therein.

Figure 3:
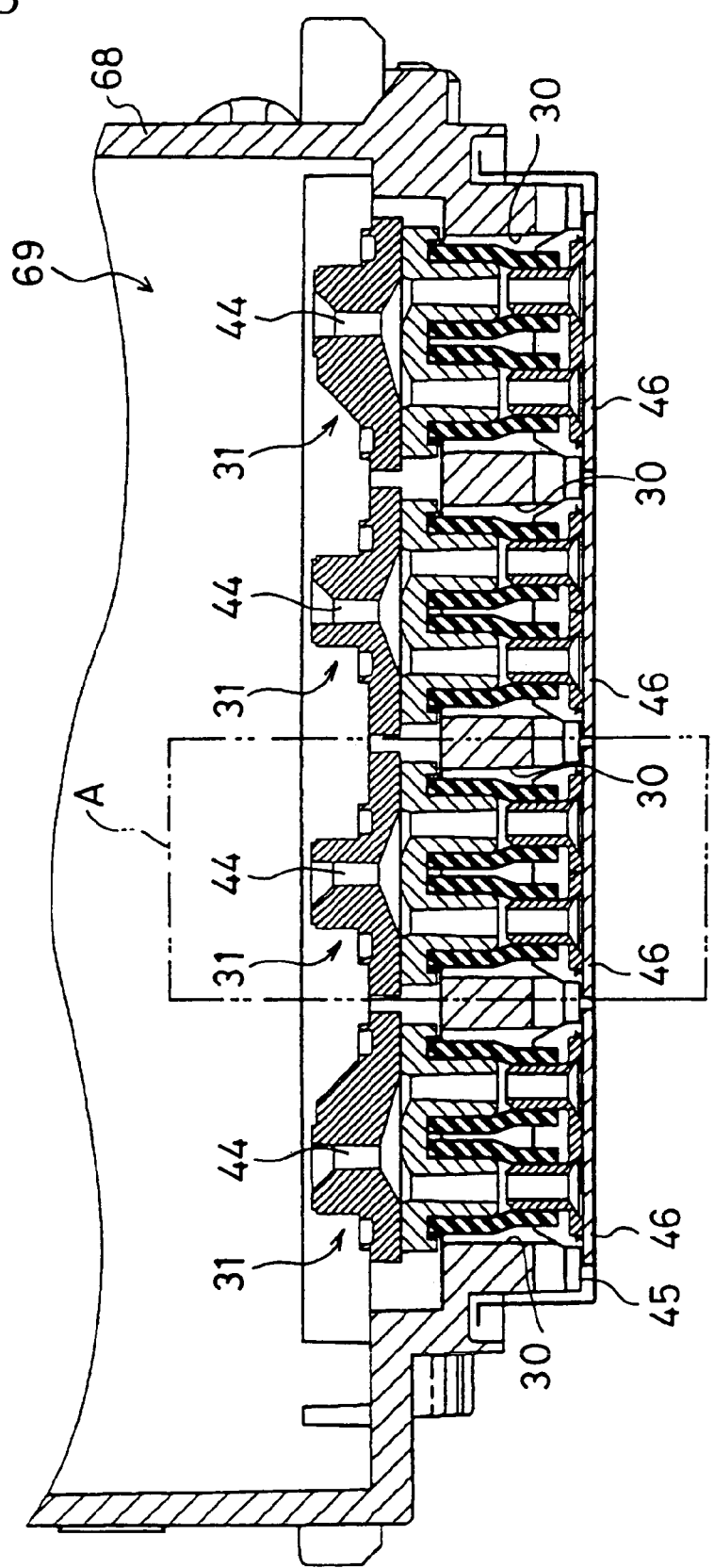
FIG. 3 is a cross-section view taken along 3-3 in FIG. 2.

As shown in FIG. 3, the frame member 68 has four through-holes 30 which are vertically formed through a thickness of the bottom wall 45, communicate with an inner space of the support portion 69, and correspond to the four ink ejector units 46, respectively. The four through-holes 30 are provided with respective joint members 31 having respective flow passages 44.

Figure 5A:
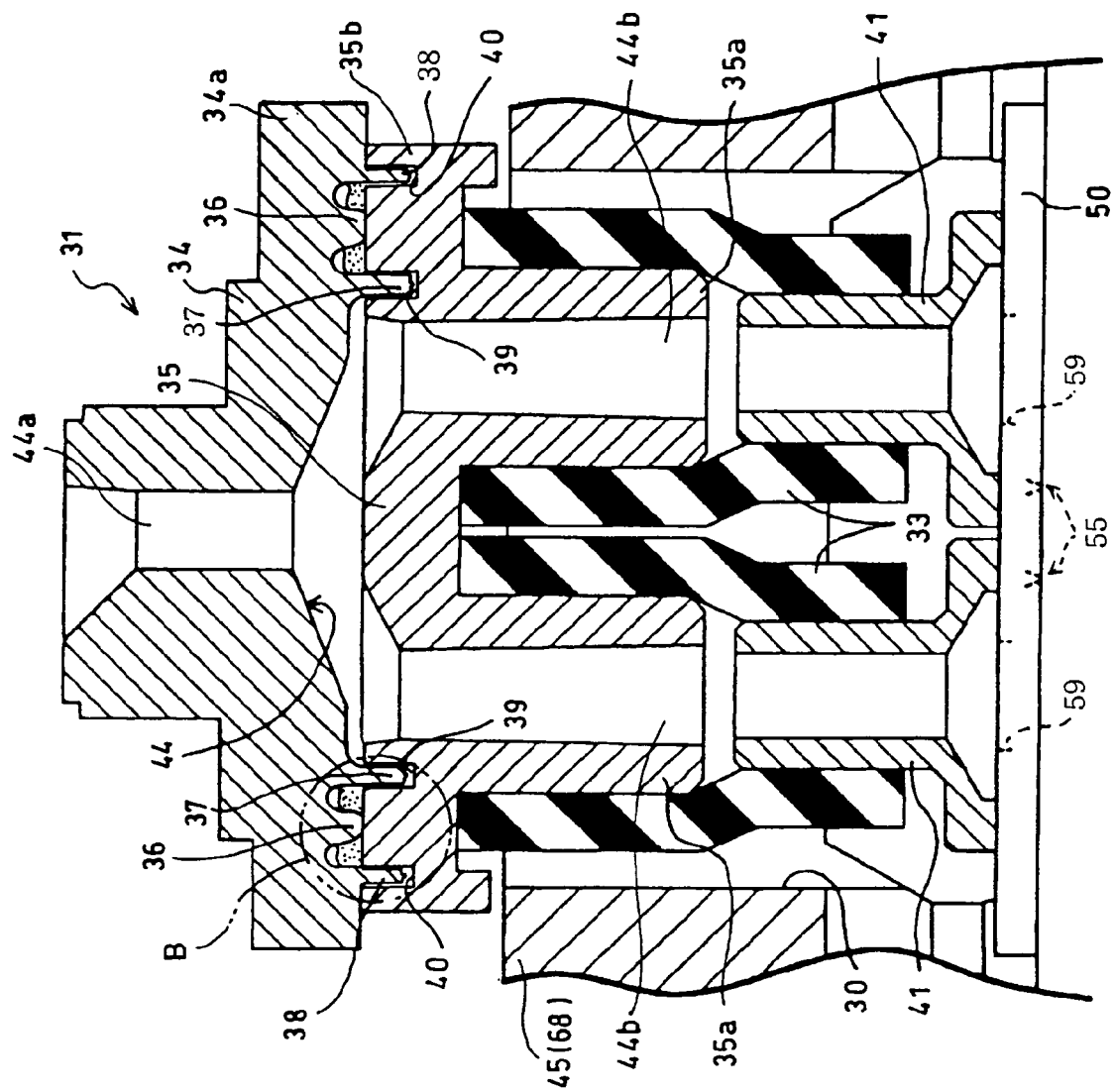
FIG. 5A is an enlarged view of a portion of the recording head, enveloped by two-dot-chain line in FIG. 3.

FIG. 5A shows a portion of the recording head 63 that is indicated at "A" in FIG. 3. Each of the joint members 31 is constituted by a first member 34 and a second member 35 which are jointed to each other, and has, therein, a bifurcated flow passage 44 having an inverted Y-shaped configuration. The first member 34 has a single common portion 44a of the flow passage 44, and an ink supply source (i.e., a corresponding one of the four ink cartridges 61) is detachably attached to an upper end of the first member 34. The second member 35 includes two tubular portions 35a, 35a having, therein, respective bifurcated portions 44b, 44b of the flow passage 44 that are bifurcated from the single common portion 44a. The first and second members 34, 35 include respective flange portions 34a, 35b, and are fixed to the frame member 68 such that the flange portions 34a, 35b are held in contact with a portion of the bottom wall 45 (or the frame member 68) that defines the through-hole 30.

The two tubular members 41 fixed to the ink ejector unit 46 are connected to the two tubular portions 35a of the joint member 31 via respective flexible cylindrical tubes 33, 33 each of which is formed of an elastically deformable material (e.g., rubber). One of opposite ends of the each tube 33 is fitted on an outer circumferential surface of a corresponding one of the two tubular portions 35a of the joint member 31; and the other end of the each tube 33 is fitted on an outer circumferential surface of a corresponding one of the two tubular members 41 fixed to the ink ejector unit 46. Thus, the ink is supplied from the fluid passage 44 to the ejector unit 46.

The first and second members 34, 35 are each formed of a resin material, and are jointed to each other by subjecting an annular weldable portion 36 (described in detail, later) of the first member 34 to supersonic welding (also described in detail, later). The first member 34 has, in a surface thereof opposed to the second member 35, the annular weldable portion 36, an annular first projecting portion 37, and an annular second projecting portion 38 each of which surrounds the flow passage 44; and the second member 35 has, in a surface 20 thereof opposed to the first member 34, an annular first groove 39 and an annular second groove 40 each of which surrounds the flow passage 44.

Figure 5B:
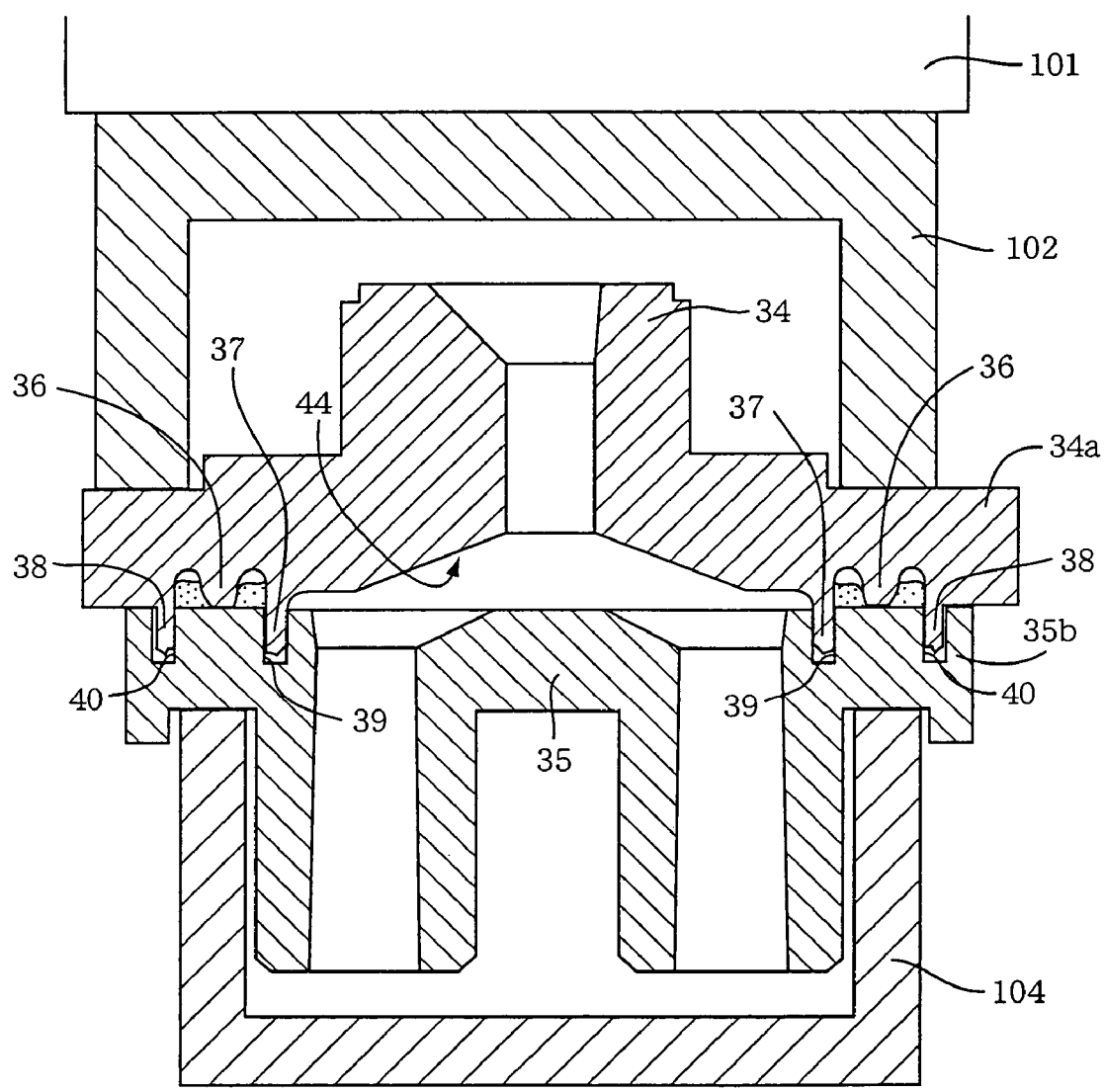
FIG. 5B is a view of a portion of the recording head which is undergoing a welding step.
Figure 6:
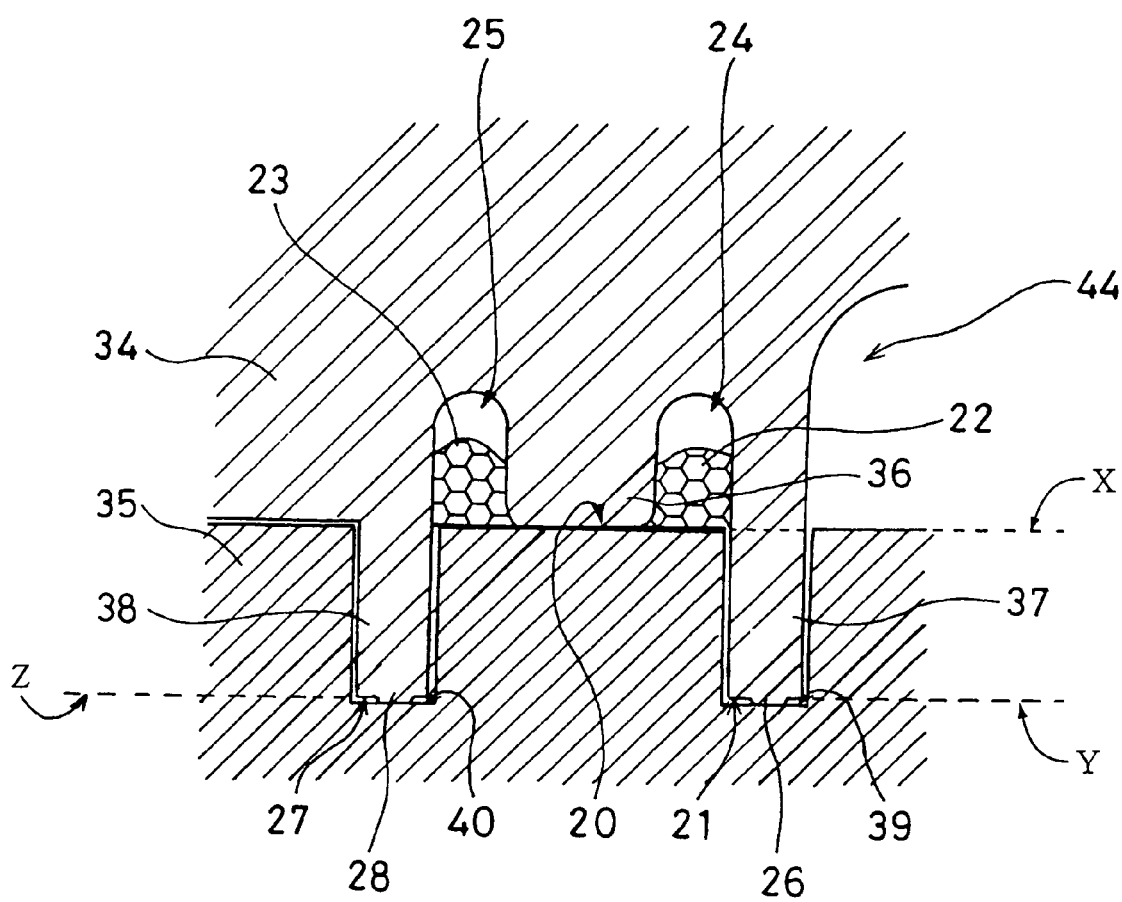
FIG. 6 is an enlarged view of a portion of the recording head, enveloped by two-dot-chain line in FIG. 5A.

FIG. 6 shows a portion of the joint member 31 that is indicated at "B" in FIG. 5A, and the joint member 31 is produced by jointing the first and second members 34, 35 to each other as illustrated in FIGS. 5B, 7A, 7B, and 7C. The weldable portion 36 projects from the first member 34 toward the second member 35, and includes a tapered end portion (FIG. 7A) whose thickness decreases in a direction toward a tip end thereof. In a state in which the tip end of the weldable portion 36 contacts the opposed surface 20 of the second member 35, the first and second members 34, 35 are jointed to each other, by welding the weldable portion 36 to the opposed surface 20. Since the tapered, thin portion of the weldable portion 36 is fused earlier than the remaining, thick portion of the same 36, the two members 34, 35 are jointed to each other at a first position, X, corresponding to the opposed surface 20 of the second member 35. In FIG. 6, reference numerals 22, 23 designate respective fused and solidified portions of the weldable portion 36, indicated at "honeycomb" hatching.

The first projecting portion 37 is located between the weldable portion 36 and the flow passage 44, such that a first space 24 is provided between the weldable portion 36 and the first projecting portion 37, and the first projecting portion 37 projects from the first member 34 toward the second member 35, such that the first projecting portion 37 is longer than the weldable portion 36. The second member 35 has the first groove 39, such that the first groove 39 receives an end portion of the first projecting portion 37. The first projecting portion 37 includes an annular weldable portion 26 projecting from an end surface thereof.

The second projecting portion 38 is located on an opposite side of the weldable portion 36 from the flow passage 44, such that a second space 25 is provided between the weldable portion 36 and the second projecting portion 38, and the second projecting portion 38 projects from the first member 34 toward the second member 35, such that the second projecting portion 38 is longer than the weldable portion 36. The second member 35 has the second groove 40, such that the second groove 40 receives an end portion of the second projecting portion 40. The second projecting portion 38 includes an annular weldable portion 28 projecting from an end surface thereof.

Figure 7A:
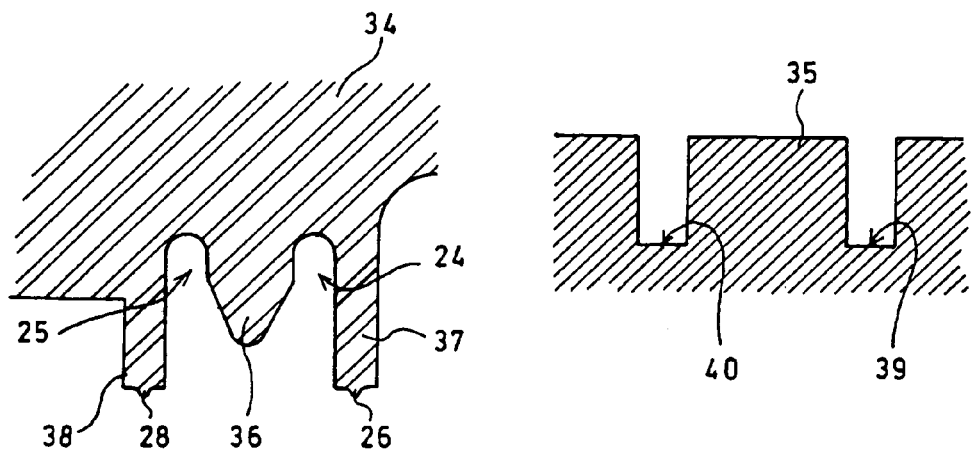
FIGS. 7A, 7B, and 7C are illustrative views for explaining a joint-structure producing method to which the present invention is applied.
Figure 7B:
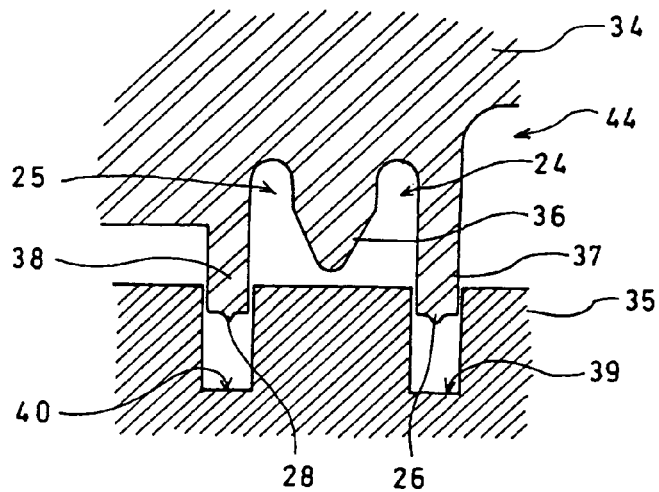

As shown in FIG. 7B, when the tip end of the weldable portion 36 just contacts the opposed surface 20 of the second member 35, the first and second projecting portions 37, 38 are fitted in the first and second grooves 39, 40, respectively, but the weldable portions 26, 28 of the first and second projecting portions 37, 38 do not contact respective inner bottom surfaces of the first and second grooves 39, 40. This is assured by respective heights of the weldable portion 36 and the first and second projecting portions 37, 38, and respective depths of the first and second grooves 39, 40. While the tapered end portion of the weldable portion 36 and the opposed surface 20 of the second member 35 are welded, and thereby jointed, to each other, the weldable portions 26, 28 of the first and second projecting portions 37, 38 contact the respective inner bottom surfaces of the first and second grooves 39, 40 and are welded thereto. Since respective amounts of fused materials of the weldable portions 26, 28 are small, the fused materials do not overflow the grooves 39, 40. A bonding or jointing strength of the two members 34, 35 is produced by the welding of the weldable portion 36 to the opposed surface 20 of the second member 35.

Figure 7C:
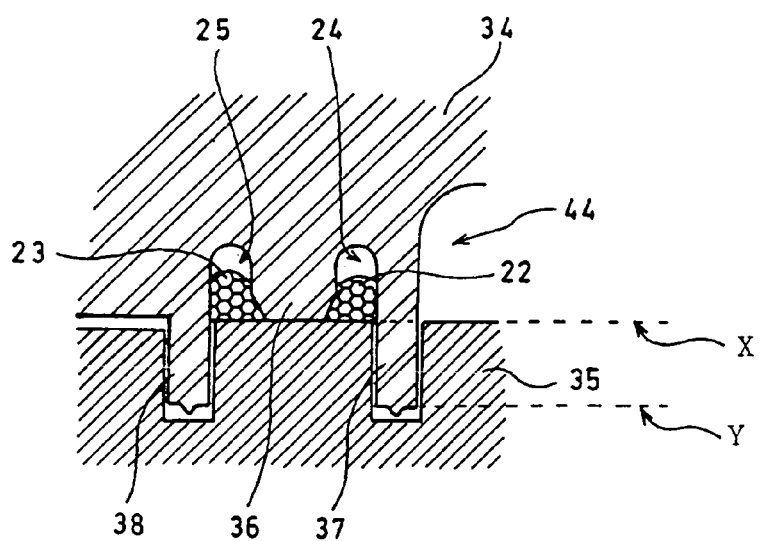
Figure 8:
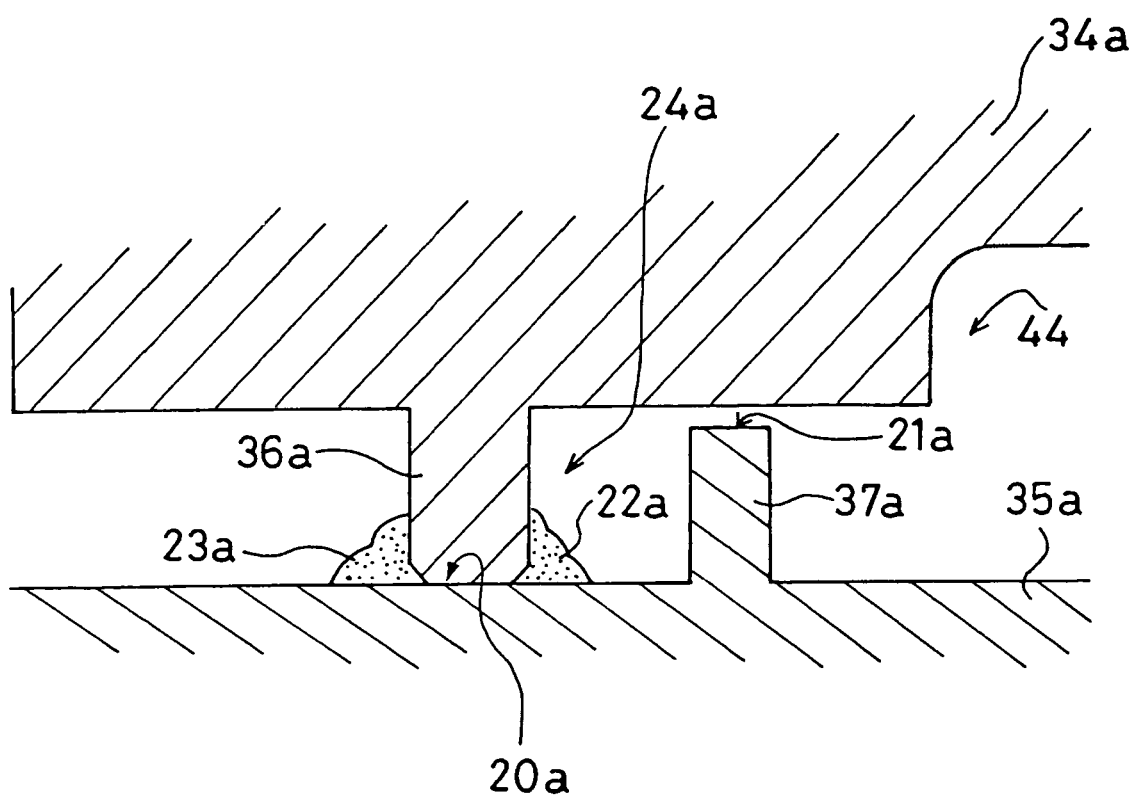
FIG. 8 is an enlarged, cross-section view of a portion of another joint structure as a first modified embodiment of the present invention.
Figure 9:
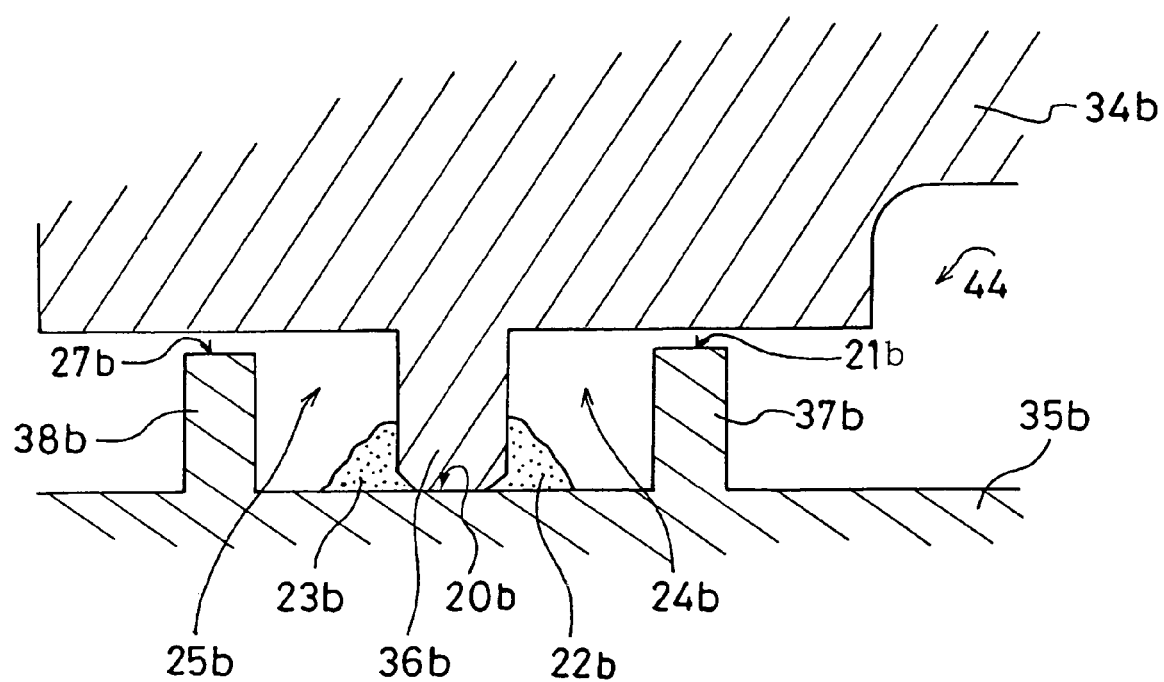
FIG. 9 is an enlarged, cross-section view of a portion of another joint structure as a second modified embodiment of the present invention.
Figure 10:
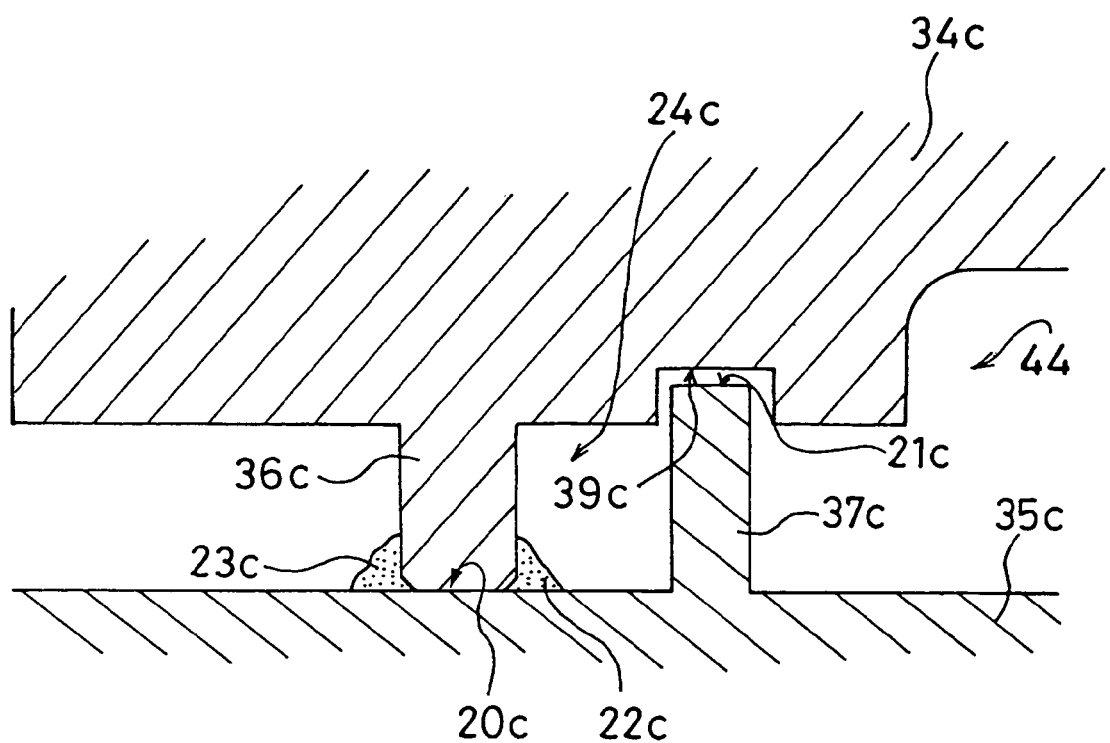
FIG. 10 is an enlarged, cross-section view of a portion of another joint structure as a third modified embodiment of the present invention.
Figure 11:
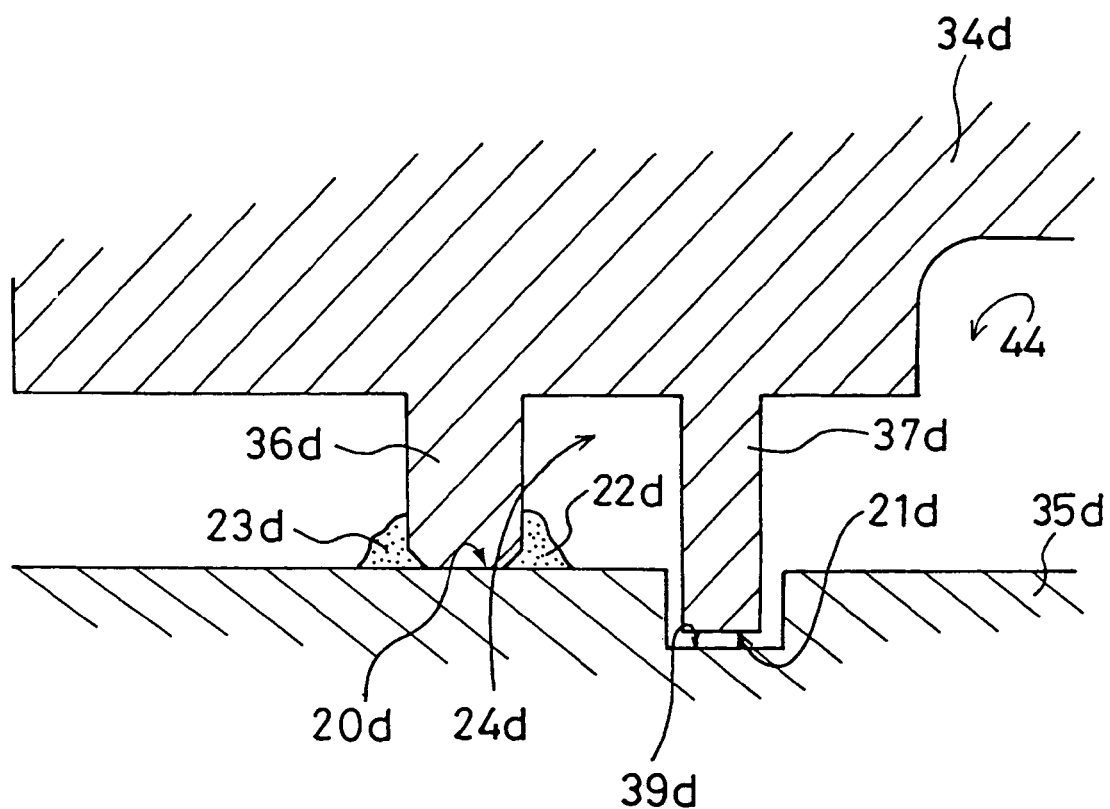
FIG. 11 is an enlarged, cross-section view of a portion of another joint structure as a fourth modified embodiment of the present invention.
Figure 12:
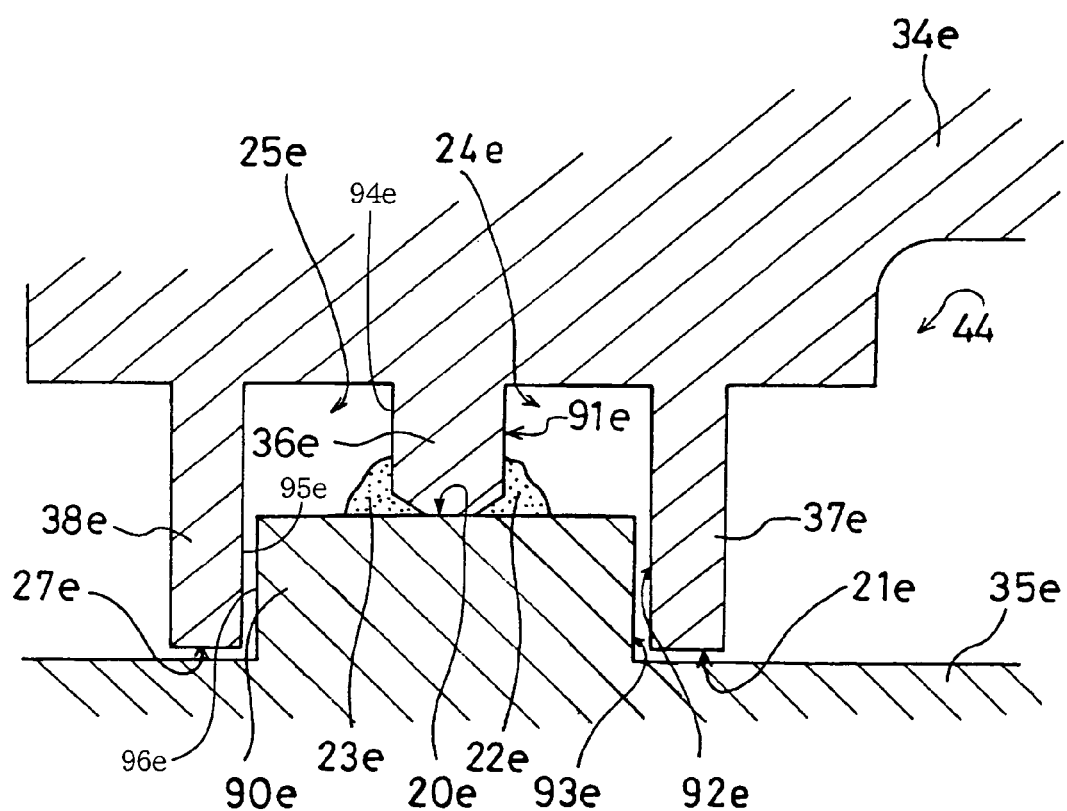
FIG. 12 is an enlarged, cross-section view of a portion of another joint structure as a fifth modified embodiment of the present invention.
Figure 13:
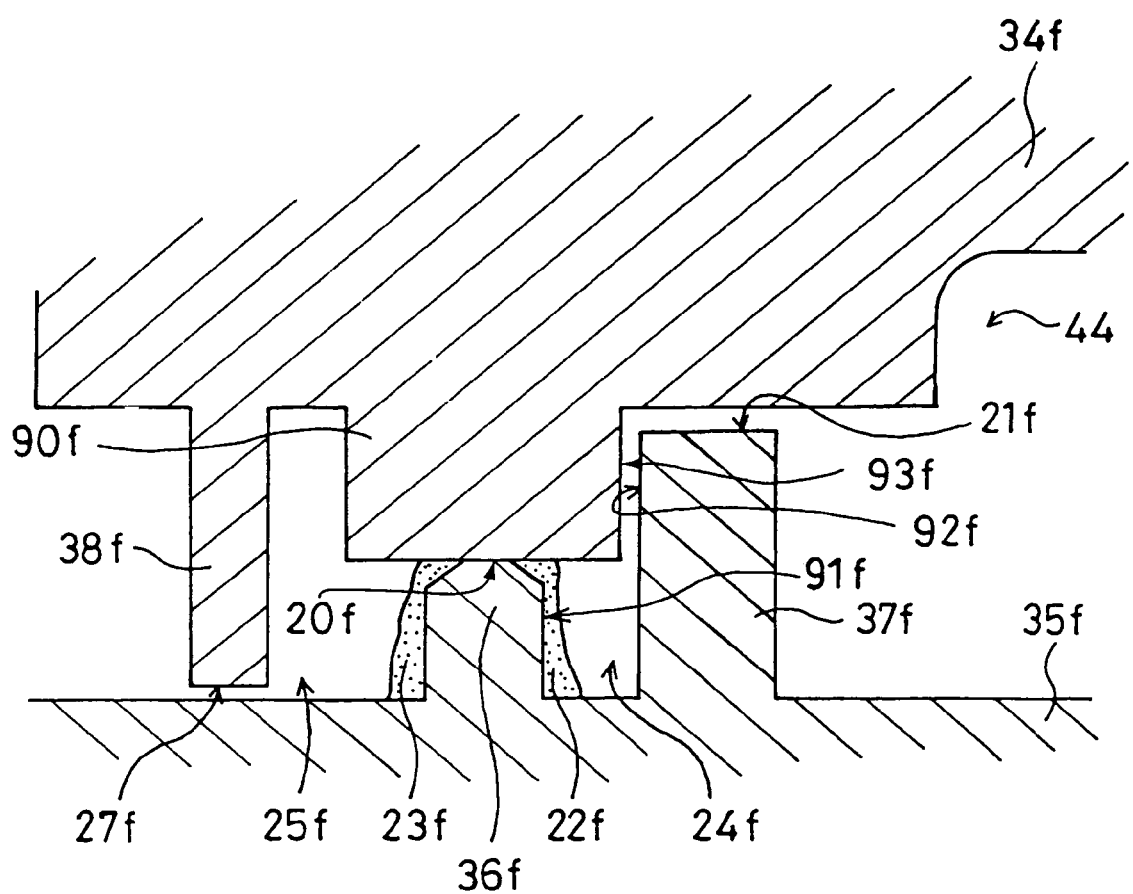
FIG. 13 is an enlarged, cross-section view of a portion of another joint structure as a sixth modified embodiment of the present invention.
Figure 14:
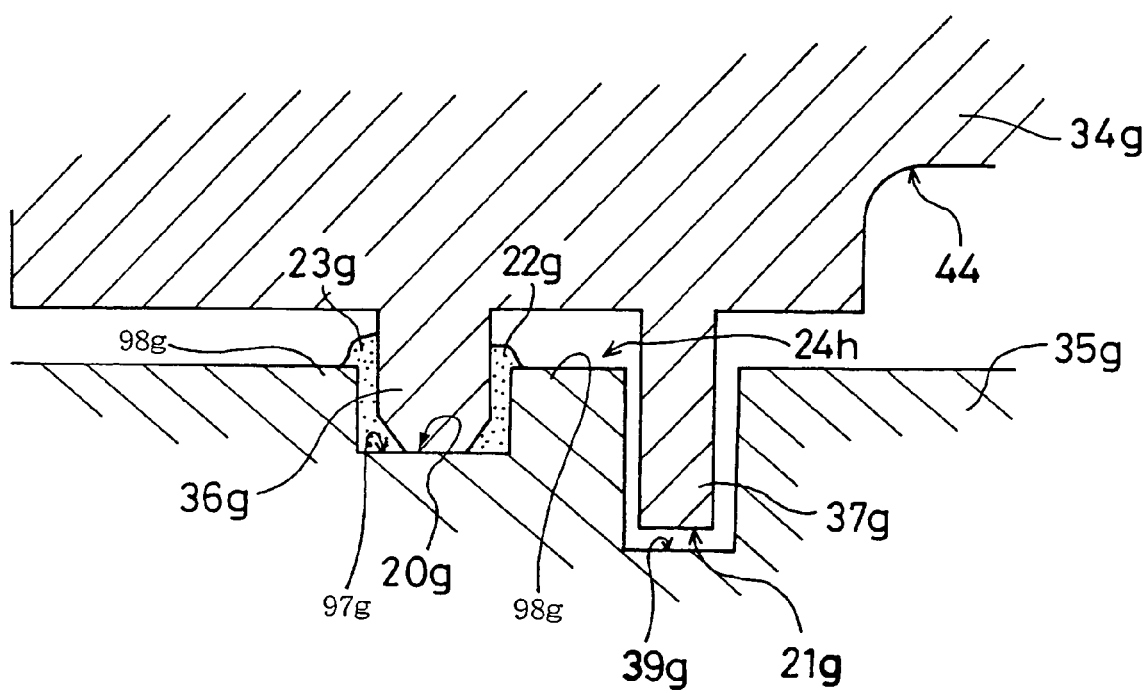
FIG. 14 is an enlarged, cross-section view of a portion of another joint structure as a seventh modified embodiment of the present invention.
Figure 15:
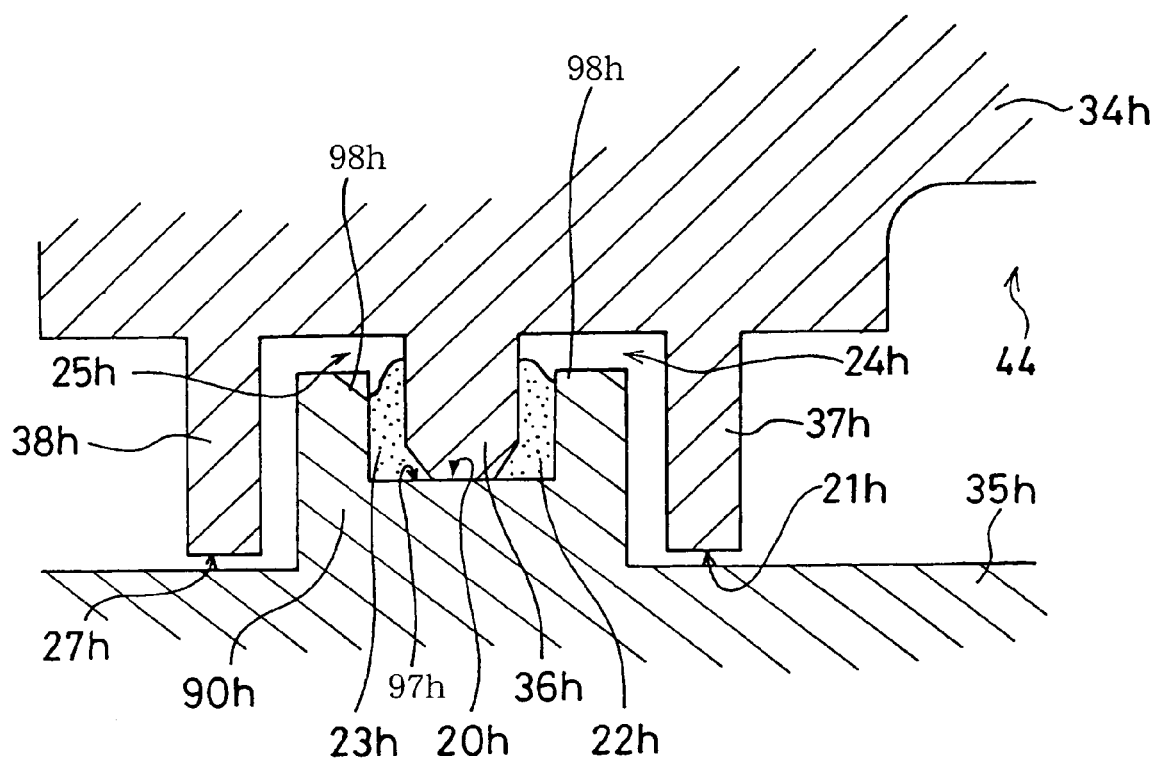
FIG. 15 is an enlarged, cross-section view of a portion of another joint structure as an eighth modified embodiment of the present invention.

As is apparent from the foregoing description, a second position, Y, of the end surface of the first projecting portion 37 and a third position, Z, of the end surface of the second projecting portion 38 differs from the first position X where the weldable portion 36 and the second member 35 are welded to each other, in a direction in which the first and second members 34, 35 are opposed to each other. Therefore, when the first and second members 34, 35 are jointed to each other, the first position X where the weldable portion 36 is welded to the second member 35 corresponds to an intermediate portion of an outer surface of the first projecting portion 37 and an intermediate portion of an inner surface of the second projecting portion 38, and accordingly respective fused materials (i.e., resins) of the weldable portion 36 that flow on opposite sides of the weldable portion 36 on the opposed surface 20 of the second member 35 are stopped by those side surfaces of the first and second projecting portions 37, 38, as shown in FIG. 7C. Since only small gaps are left between an outer side surface of the first groove 39 and the outer surface of the first projecting portion 37, and between an inner side surface of the second groove 40 and the inner surface of the second projecting portion 38, the fused resins cannot flow into those gaps because of a high flow resistance thereof. Thus, the fused resins are prevented from flowing into the flow passage 44 or an outside space of the second projecting portion 38.

In a state in which the first and second members 34, 35 have already been jointed to each other, respective volumes of the first and second spaces 24, 25, defined by the first member 34 and the opposed surface 20 of the second member 35, are greater than respective volumes of the respective fused resins of the weldable portion 36 that flow on the opposite sides of the same 36 on the surface 20.

Since both of the first and second projecting portions 37, 38 project from the first member 34, longer than the weldable portion 36, the weldable portion 36 is protected by the first and second projecting portions 37, 38. Therefore, the weldable portion 36 is prevented from contacting foreign matters, for example, when the first member 34 is transported before welding, and accordingly is prevented from being damaged. Thus, the tapered end portion of the weldable portion 36 can be easily kept intact, and can be prevented from being inappropriately welded.

Next, there will be described a method of jointing the first and second members 34, 35 to each other and thereby producing the joint member 31 defining the flow passage 44 in which the ink as the fluid can flow. This method includes a constituent-member preparing step in which the first and second constituent members 34, 35 are prepared, and a jointing step in which the first and second constituent members 34, 35 are jointed to each other.

In the constituent-member preparing step, shown in FIG. 7A, first, the first member 34 including the weldable portion 36, the first projecting portion 37 with the weldable portion 26, and the second projecting portion 38 with the weldable portion 28, and having the first and second spaces 24, 25, is prepared. Then, the second member 35 having the first and second grooves 39, 40, is prepared. Each of the first and second members 34, 35 is formed, by injection molding, of a synthetic resin material.

The jointing step includes a positioning step and a welding step. In the positioning step, shown in FIG. 7B, first, the first and second members 34, 35 are positioned relative to each other. More specifically described, the free end portion of the first projecting portion 37 is fitted in the first groove 39, and the free end portion of the second projecting portion 38 is fitted in the second groove 40, whereby the first and second members 34, 35 are positioned relative to each other. Then, the free end portion of the weldable portion 36 is contacted with the opposed surface 20 of the second member 35.

In the welding step, shown in FIG. 7C, a horn (i.e., a supersonic wave emitter) 101, shown in FIG. 5B, is applied via a bracket 102 to one 34 of the first and second members 34, 35 that are positioned relative to each other, the second member 35 is held by a jig 104, and the horn 101 is operated to emit a supersonic wave so as to supply supersonic wave energy to the free end portion of the weldable portion 36 that is contacted with the opposed surface 20 of the second member 35. While the free end portion of the weldable portion 36 is fused by the supersonic wave energy, the first and/or second members 34, 35 are/is moved toward each other. Respective fused resins of the weldable portion 36 that flow on either side of the weldable portion 36 on the opposed surface 20 are blocked by the first and second projecting portions 37, 38, and are accommodated by the first and second spaces 24, 25. Thus, the fused resins are effectively prevented from flowing into the flow passage 44 or the outside space opposite to the flow passage 44. Then, when the weldable portions 26, 28 contact the respective inner bottom surfaces of the first and second grooves 39, 40, the weldable portions 26, 28 are fused, but the fused resins do not overflow the grooves 39, 40.

When the first and second members 34, 35 have been moved relative to each other to a predetermined relative position, the supplying of the supersonic wave energy is cut off, and the relative movement of the first and second members 34, 35 is stopped. When the fused resins have been fully solidified, the first and second members 34, 35 are jointed to each other, whereby the respective flow passages 44 of the first and second members 34, 35 are connected to each other.

As is apparent from the foregoing description of the illustrated embodiment, when the first and second members 34, 35 are jointed to each other so as to form the flow passage 44, the fused resins can be effectively prevented from flowing into the flow passage 44. Therefore, the flow passage 44 in which the ink flows enjoys a sufficiently large cross section area. In addition, the fused, and then solidified, resins can be prevented from mixing with the ink flowing in the flow passage 44. Thus, the recording head 63 can enjoy high quality and reliability. The first projecting portion 37 and the first groove 39 provide a first and a second flow preventing portion, respectively, which cooperate with each other to substantially close the first space 24 as a fused-portion trapping space and which have respective shapes allowing, in a state in which the first space 24 is substantially closed, a relative movement of the first and second members 34, 35 toward each other. The first projection 37 can be said as a flow preventing portion, and the first groove 39 can be said as a flow-preventing-portion receiving recessed portion which receives an end portion of the first projection 37 as the flow preventing portion.

While the present invention has been described in its preferred embodiment, it is to be understood that the present invention is not limited to the details of the above-described embodiment but may otherwise be embodied in various manners. For example, the above-described embodiment may be modified as follows:

FIGS. 8, 9, 10, 11, 12, 13, 14, and 15, each corresponding to FIG. 6, show a first, a second, a third, a fourth, a fifth, a sixth, a seventh, and an eighth modified embodiment of the present invention, respectively, each of which relates to a joint member. The same reference numerals as used in the basic embodiment shown in FIG. 6 are used to designate the corresponding elements or portions of each of the first to eighth modified embodiments shown in FIGS. 8 to 15, but are suffixed with a corresponding one of alphabetic letters, a, b, c, d, e, f, g, and h so as to be distinguishable from each other.

(1) First Modified Embodiment: A joint member, shown in FIG. 8, does not include a projecting portion, a space, or a groove corresponding to the second projecting portion 38, the second space 25, and the second groove 40 of the basic joint member 31, shown in FIG. 6. A weldable portion 36*a* of this joint member projects from a first member 34*a* toward a second member 35*a*, and a first projecting portion 37*a* projects from the second member 35*a* toward the first member 34*a*, with a first space 24*a* being provided between the first projecting portion 37*a* and the weldable portion 36*a*. An end portion of the weldable portion 36*a* is fused into respective fused portions or materials (i.e., resins) 22*a*, 23*a* on either side of the weldable portion 36*a* on an opposed surface 20*a* of the second member 35*a*, and the opposed surface 20*a* is located at a first position different from a second position where an end surface 21*a* of the first projecting portion 37*a* is located, in a direction in which the first and second members 34*a*, 35*a* are opposed to each other. The first projecting portion 37*a* functions as a flow preventing portion.

(2) Second Modified Embodiment: A joint member, shown in FIG. 9, has a construction similar to that of the joint member shown in FIG. 8, and additionally has a second projecting portion 38*b* which projects from a second member 35*b* toward a first member 34*b*, with a second space 25*b* being provided between the second projecting portion 38*b* and a weldable portion 36*b*. An end portion of the weldable portion 36*b* is fused into respective fused portions 22*b*, 23*b* on either side of the weldable portion 36*b* on an opposed surface 20*b* of the second member 35*b*, and the opposed surface 20*b* is located at a first position different from a second position where an end surface 21*b* of a first projecting portion 37*b* is located, in a direction in which the first and second members 34*b*, 35*b* are opposed to each other. The first projection 37*b* functions as a flow preventing portion.

(3) Third Modified Embodiment: A joint member, shown in FIG. 10, has a construction similar to that of the joint member shown in FIG. 8, and additionally has a first groove 39*c* at a position aligned with a first projecting portion 37*c* which projects from a second member 35*c* toward a first member 34*c*, with a first space 24*c* being provided between the first projecting portion 37*c* and a weldable portion 36*c*, such that an end portion of the first projecting portion 37*c* is fitted in the first groove 39*c*. An end portion of the weldable portion 36*c* is fused into respective fused portions 22*c*, 23*c* on either side of the weldable portion 36*c* on an opposed surface 20*c* of the second member 35*c*, and the opposed surface 20*c* is located at a first position different from a second position where an end surface 21*c* of the first projecting portion 37*c* is located, in a direction in which the first and second members 34*c*, 35*c* are opposed to each other. The first projecting portion 37*c* and the first groove 39*c* function as a first and a second flow preventing portion, respectively.

(4) Fourth Modified Embodiment: A joint member, shown in FIG. 11, has a construction similar to that of the joint member shown in FIG. 10, but differs from the latter joint member in that a first projecting portion 37*d* of the former joint member projects from a first member 34*d* toward a second member 35*d*, and a first groove 39*d* of the former joint member in which an end portion of the first projecting portion 37*d* is fitted is formed in an opposed surface 20*d* of the second member 35*d*. An end portion of a weldable portion 36*d* is fused into respective fused portions 22*d*, 23*d* on either side of the weldable portion 36*d* on the opposed surface 20*d* of the second member 35*d*, and the opposed surface 20*d* is located at a first position different from a second position where an end surface 21*d* of the first projecting portion 37*d* is located, in a direction in which the first and second members 34*d*, 35*d* are opposed to each other. The first projecting portion 37*d* and the first groove 39*d* function as a first and a second flow preventing portion, respectively.

(5) Fifth Modified Embodiment: A joint member, shown in FIG. 12, has a construction similar to that of the joint member shown in FIG. 6, but does not have any grooves in which respective end portions of a first and a second projecting portion 37*e*, 38*e* are fitted. However, this joint member additionally has an annular third projecting portion 90*e* which projects from a second member 35*e* toward a weldable portion 36*e* projecting from a first member 34*e*, such that an opposed surface 20*e* of the third projecting portion 90*e* is located at a first position different from each of a second position where an end surface 21*e* of the first projecting portion 37*e* is located and a third position where an end surface 27*e* of the second projecting portion 38*e* is located, in a direction in which the first and second members 34e, 35e are opposed to each other. An end portion of the weldable portion 36e is fused into respective fused portions 22e, 23e on either side of the weldable portion 36e on the opposed surface 20e of the second member 35e. The third projecting portion 90e has an inner surface 93e which is opposed to an outer surface 92e of the first projecting portion 37e and is located at a position nearer to the outer surface 92e of the first projecting portion 37e than to an inner surface 91e of the weldable portion 36e; and an outer surface 96e which is opposed to an inner surface 95e of the second projecting portion 38e and is located at a position nearer to the inner surface 95e of the second projecting portion 38e than to an outer surface 94e of the weldable portion 36e. A gap left between the inner surface 93e of the third projecting portion 90e and the outer surface 92e of the first projecting portion 38e, and a gap left between the outer surface 96e of the third projecting portion 90e and the inner surface 95e of the second projecting portion 38e are small, and accordingly exhibit respective high resistances to respective flows of the fused materials 22e, 23e from the weldable portion 36e. Thus, when the first and second members 34e, 35e are welded to each other, the fused materials 22e, 23e can be effectively prevented from flowing into a flow passage 44 or an outside space opposite to the flow passage 44 with respect to the weldable portion 36e. The first projecting portion 37e and the third projecting portion 90e function as a first and a second flow preventing portion, respectively.

(6) Sixth Modified Embodiment: A joint member, shown in FIG. 13, has a construction similar to that of the joint member shown in FIG. 12, but differs from the latter joint member in that the former joint member has a weldable portion 36f and a first projecting portion 37f each of which projects from a second member 35f toward a first member 34f; and a third projecting portion 90f and a second projecting portion 38f each of which projects from the first member 34f toward the second member 35f. An end surface 20f of the third projecting portion 90f is located at a first position different from each of a second position where an end surface 21f of the first projecting portion 37f is located and a third position where an end surface 27f of the second projecting portion 38f is located, in a direction in which the first and second members 34f, 35f are opposed to each other. An end portion of the weldable portion 36f is fused into respective fused portions 22f, 23f on either side of the weldable portion 36f. The third projecting portion 90f has an inner surface 93f which is opposed to an outer surface 92f of the first projecting portion 37f and is located at a position nearer to the outer surface 92f of the first projecting portion 37f than to an inner surface 91f of the weldable portion 36f. Only a gap left between the inner surface 93f of the third projecting portion 90f and the outer surface of the first projecting portion 38f is small, and exhibits a high resistance to the flow of the fused portion 22f from the weldable portion 36f. Thus, when the first and second members 34f, 35f are welded to each other, the fused portion 22f can be effectively prevented from flowing into a flow passage 44. The first projecting portion 37f and the third projecting portion 90f function as a first and a second flow preventing portion, respectively.

(7) Seventh Modified Embodiment: A joint member, shown in FIG. 14, has a construction similar to that of the joint member shown in FIG. 11, but differs from the latter joint member in that the former joint member has an annular third groove 97g which is formed in a wall 98g of a second member 35g, at a position aligned with a weldable portion 36g projecting from a first member 34g. Thus, an end portion of the weldable portion 36g is welded to an opposed surface 20g, i.e., an inner bottom surface of the third groove 97g. The opposed surface 20g of the second member 35g is located at a first position different from a second position where an end surface 21g of a first projecting portion 37g whose end portion is fitted in a first groove 39g is located, in a direction in which the first and second members 34g, 35g are opposed to each other. An end portion of the weldable portion 36g is fused into respective fused portions 22g, 23g on either side of the weldable portion 36g on the opposed surface 20g of the second member 35g. Since the opposed surface 20g to which the end portion of the weldable portion 36g is to be welded is provided in the bottom of the third groove 97g, the opposed surface 20g can be effectively prevented from being contacted with foreign matters and thereby being damaged when, e.g., the second member 35g is transported before welding. Thus, the opposed surface 20g of the second member 35g can be easily kept intact, and the weldable portion 36g can be prevented from being inappropriately welded to the opposed surface 20g. The first projecting portion 37g and the first groove 39g function as a first and a second flow preventing portion, respectively.

(8) Eighth Modified Embodiment: A joint member, shown in FIG. 15, has a construction similar to that of the joint member shown in FIG. 12, but differs from the latter joint member in that the former joint member has an annular third groove 97h which is formed in an annular third projection 90h projecting from a second member 35h, at a position aligned with a weldable portion 36h projecting from a first member 34h. An end portion of the weldable portion 36h is welded to an opposed surface 20h, i.e., an inner bottom surface of the third groove 97h. The opposed surface 20h of the second member 35h is located at a first position different from each of a second position where an end surface 21h of a first projecting portion 37h is located and a second position where an end surface 27h of a second projecting portion 38h is located, in a direction in which the first and second members 34h, 35h are opposed to each other. An end portion of the weldable portion 36h is fused into respective fused portions 22h, 23h on either side of the weldable portion 36h on the opposed surface 20h of the second member 35h. Since the opposed surface 20h to which the end portion of the weldable portion 36h is to be welded is provided in the bottom of the third groove 97h, the opposed surface 20h can be effectively prevented from being contacted with foreign matters and thereby being damaged, like the joint member shown in FIG. 14. In addition, since the first and second projecting portions 37h, 38h are longer than the weldable portion 36h, the end portion of the weldable portion 36h can also be prevented from being contacted with foreign matters and thereby being damaged. Thus, the first and second members 34h, 35h can be welded to each other without producing any defects. The first projecting portion 37h and a portion of the second member 35h that is opposed to an end surface of the first projection portion 37h function as a first and a second flow preventing portion, respectively.

Like the basic embodiment shown in FIG. 6, each of the first to eighth modified embodiments shown in FIGS. 8 through 15, is designed such that the first member 34a through 34h is located on an upper side and the second member 35a through 35h is located on a lower side, such that the second position where the end surface 21a through 21h of the first projecting portion 37a through 37h is located is different from the first position where the weldable portion 36a through 36h is welded to the second member 35a through 35h, in the direction in which the first and second members 34a through 34h, 35a through 35h are opposed to each other, and such that the volume of the first space 24a through 24h is greater than that of the fused and solidified portion 22a through 22h which is produced on the side of the flow passage 44. In addition, each of the second, fifth, sixth, and eighth modified embodiments shown in FIGS. 9, 12, 13, and 15, is designed such that the third position where the end surface 27b, 27e 27f, 27h of the second projecting portion 37b, 37e, 37f, 37h is located is different from the first position where the weldable portion 36b, 36e, 36f, 36h is welded to the second member 35b, 35e, 35f, 35h, in the same direction as indicated above, and such that the volume of the second space 24b, 24e, 24f, 24h is greater than that of the fused and solidified portion 23b, 23e, 23f, 23h which is produced on an opposite side of the weldable portion that is opposite to the flow passage 44. Therefore, the fused resins can be effectively prevented from flowing into the flow passage 44 and, regarding the modified embodiments employing the second projecting portion 38b, 38e, 38f, 38h, additionally from flowing into the outside space opposite to the flow passage 44.

In each of the first to eighth modified embodiments, the end surface 21a through 21h of the first projecting portion 37a through 37h and the end surface 27b, 27e, 27f, 27h of the second projecting portion 38b, 38e, 38f, 38h may be provided with respective weldable portions like the weldable portions 26, 28 employed in the basic embodiment shown in FIG. 6. In this case, respective end portions of those weldable portions are fused, on the first or second member 34a through 34h, 35a through 35h, by respective small amounts which cannot flow into the flow passage 44. However, in the case where the first projecting portion 37a through 37h and the second projecting portion 38b, 38e, 38f, 38h are not provided with those weldable portions, it is preferred that respective small gaps be provided between the end surface 21a through 21h of the first projecting portion 37a through 37h and the end surface 27b, 27e, 27f, 27h of the second projecting portion 38b, 38e, 38f, 38h and the first and/or second members 34a through 34h, 35a through 35h.

Figure 16:
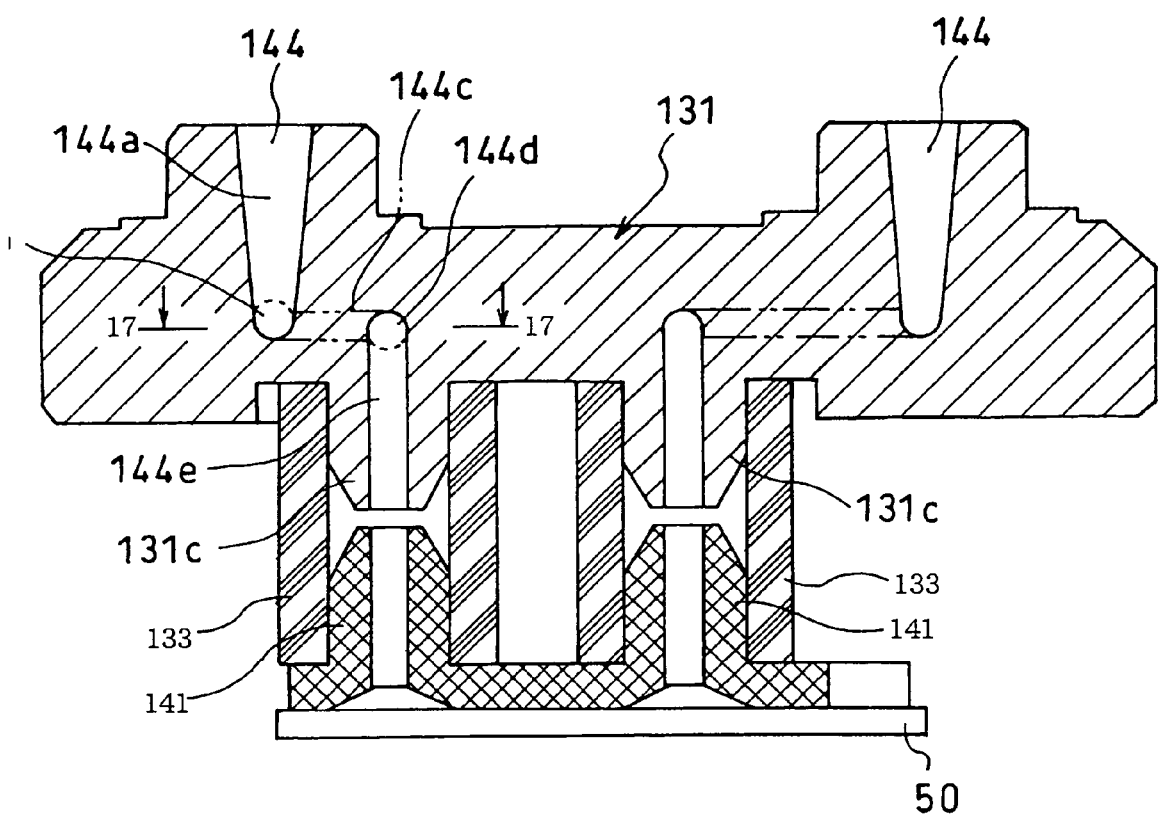
FIG. 16 is a cross-section view of another joint structure as another embodiment of the present invention.
Figure 17:
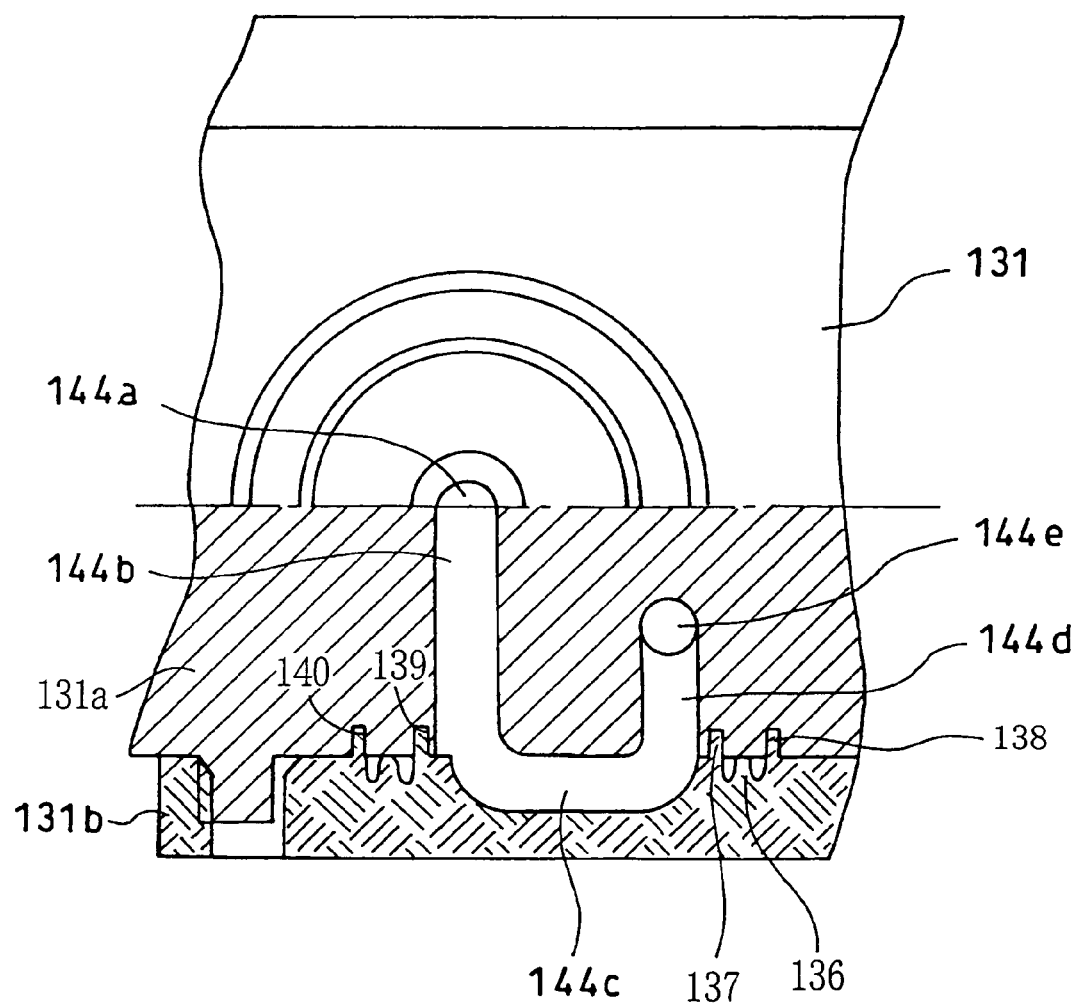
FIG. 17 is a view including, in an upper half portion thereof, a plan view of the joint structure shown in FIG. 16 and, in a lower half portion thereof, a cross-section view taken along 17-17 in FIG. 16.

FIGS. 16 and 17 shows another joint member as another embodiment of the present invention. This joint member may be employed by the ink ejector unit 46 shown in FIG. 4. Two tubular members 141, 141 which are integral with each other are fixed to two ink supply inlets of a cavity plate 50 of an ink ejector unit, respectively. A joint member 131 connects between an ink supply source (i.e., an ink cartridge) and the tubular members 141. The joint member 131 has two independent flow passages 144, 144, and two rubber tubes 133, 133 connect between two tubular portions 131c, 131c of the joint member 131 that have respective lower end portions of the flow passages 144, and the two tubular members 141, 141, respectively. Thus, the two independent flow passages 144 can supply different color inks to two arrays of pressure chambers of the cavity plate 50, respectively.

The joint member 131 is constituted by a first constituent member 131a, and a second constituent member 131b which is jointed to a side surface of the first member 131a. Each of the two flow passages 144 includes a first portion 144a which extends from an upper surface of the first member 131a, vertically downward into an inner portion of the same 131a; a second portion 144b which extends from a lower end of the first portion 144a, horizontally toward the second member 131b, and opens in the side surface of the first member 131a to which the second member 131b is jointed; a third portion 144c which is formed in the second member 131b and extends from the open end of the second portion 144b, horizontally along the side surface of the first member 131a; a fourth portion 144d which extends from an end of the third portion 144c that is opposite to the second portion 144b, horizontally through the inner portion of the first member 131a; and a fifth portion 144e which extends from an end of the fourth portion 144d that is opposite to the third portion 144c, vertically downward through the tubular portion 131c.

More specifically described, the first member 131a has the second and fourth portions 144b, 144d that extend parallel to each other and open in the side surface thereof, and the second member 131b having a groove is jointed to the side surface of the first member 131a, such that the second member 131b covers the side surface, and opposite ends of the groove thereof are aligned with the second and fourth portions 144b, 144d, respectively. Thus, the groove of the second member 131b and the side surface of the first member 131a cooperate with each other to define the third portion 144c connecting between the second and fourth portions 144b, 144d.

When the first and second members 131a, 131b are jointed to each other so as to provide the joint member 131, the third portion 144c of the flow passage 144 is surrounded by a joint structure similar to that employed by the joint member 31 shown in FIG. 6. More specifically described, the second member 131b includes a weldable portion 136, a first projecting portion 137, and a second projecting portion 138, and the first member 131a has a first groove 139 and a second groove 140. Each of the elements 136, 137, 138, 139, 140 has a generally elliptic shape that assures that the each element surrounds the third portion 144c. Thus, the first and second members 131a, 131b are jointed to each other in the same manner as the above-described manner in which the first and second members 34, 35 are jointed to each other. Like the joint member 31 shown in FIG. 6, the joint member 131 shown in FIGS. 16 and 17 can prevent the fused resins from flowing into the flow passage 144 and can enjoy a designed, large cross-section area of the same 144. The first projecting portion 137 and the first groove 139 function as a first and a second flow preventing portion, respectively.

In each of the illustrated embodiments, each of the first projecting portion 37, 137 and the weldable portion 36, 136 may have any shape which surrounds the flow passage 44, 144. For example, each of the first projecting portion 37, 137 and the weldable portion 36, 136 may have a circular, an elliptic, or a polygonal shape. In addition, it is preferred that the first projecting portion 37, 137 be continuous over its entire length around the flow passage 44 144. However, the first projecting portion 37, 137 may have a discontinuous shape so long as one or more discontinuous portions of the first projecting portion 37, 137 has or have a flow resistance high enough to prevent the fused resin from flowing into the flow passage 44, 144.

The present invention is widely applicable to not only the joint structures employed by the ink jet printer head described above as the preferred embodiments of the invention, but also various sorts of joint structures in each of which first and second members are jointed to each other to define a flow passage in which a fluid can flow.

In each of the illustrated embodiments, the volume of the first space 24 is not smaller than the volume of the fused end portion of the weldable portion 36, 136. Thus, the fused material that is produced from the end portion of the weldable portion 36, 136 and flows on an inner side of the weldable portion that is near to the flow passage 44, 144 can be entirely accumulated in the first space 24. Therefore, the fused material can be prevented from flowing into the flow passage 44, 144.

In applicable ones of the illustrated embodiments, one of the first and second members 34, 35; 134, 135 includes the second projecting portion 38; 138 which projects, on an opposite side of the weldable portion 36, 136 from the flow passage 44, 144, toward the other of the first and second members, and reaches the third position different from the first position where the weldable portion is welded to the opposed surface 20, while the second projecting portion cooperates with the weldable portion to define a second space 25 therebetween. Thus, although, when the weldable portion is welded, the end portion of the weldable portion is fused at the first position and the fused material may flow on an opposite side of the weldable portion from the flow passage, the flowing of the fused material can be blocked by the second projecting portion, and the fused material is accumulated in the second space. Thus, when the first and second members are jointed to each other to define the flow passage in which the fluid flows, the fused material can be effectively prevented from flowing from the weldable portion and spreading out.

In applicable ones of the illustrated embodiments, one of the first and second members 34, 35; 134, 135 includes the weldable portion 36, 136 and the first projecting portion 37, 137 which project toward the other of the first and second members such that the first projecting portion is longer than the weldable portion, and the other of the first and second members has, at a position aligned with the first projecting portion, the first groove 39, 139 which receives the end portion of the first projecting portion. Thus, even if the first space 24 may be filled with the material produced by fusing the end portion of the weldable portion, the end portion of the first projecting portion longer than the weldable portion cooperates with the first groove which receives the end portion of the first projecting portion, to block the flowing of the fused material. Therefore, the fused material can be more effectively prevented from flowing into the flow passage 44, 144.

In applicable ones of the illustrated embodiments, the end portion of the first projecting portion 37, 137 includes the weldable portion 26 which is opposed to the inner bottom surface of the first groove 39, 139. Thus, even if the first space 24 may be filled with the material produced by fusing the end portion of the weldable portion 36, 136, the end portion of the first projecting portion cooperates with the first groove which receives the end portion of the first projecting portion, to block the flowing of the fused material. In addition, the flowing of the fused material is blocked by the weldable portion 26 opposed to the inner bottom surface of the first groove 39, 139. Therefore, the fused material can be still more effectively prevented from flowing into the flow passage 44, 144.

In applicable ones of the illustrated embodiments, the one of the first and second members 34, 35; 134, 135 includes the weldable portion 36, 136 and the other of the first and second members has, at a position aligned with the weldable portion, the third groove 94 (94g, 94h) which receives the end portion of the weldable portion. Thus, the material produced by fusing the end portion of the weldable portion is accumulated in the third groove. Therefore, the fused material can be effectively prevented from flowing or spreading out. In addition, since the opposed surface 20 is defined by the inner bottom surface of the third groove, the opposed surface 20 is protected since the opposed surface 20 is prevented from colliding with foreign matters and being damaged by the same when the first and second members are transported before being jointed to each other. Therefore, the opposed surface 20 can be easily kept intact, and can be prevented from being defectively welded to the weldable portion.

In applicable ones of the illustrated embodiments, the sum of respective volumes of the first and second spaces is not smaller than the volume of the fused end portion of the weldable portion 36, 136. Thus, the material produced by fusing the end portion of the weldable portion can be entirely accumulated in the first and/or second spaces. Therefore, the fused material can be more effectively prevented from flowing into the flow passage 44, 144.

In each of the illustrated embodiments, each of the first and second members 34, 35; 134, 135 is formed of a resin, and the weldable portion 36, 136 is fused, by supersonic welding, to joint the first and second members to each other. When the two resin-based members are jointed, by the supersonic welding, to each other to define the flow passage for the fluid to flow therein, the fused material can be effectively prevented from flowing into the flow passage 44, 144.

In each of the illustrated embodiments, the fluid which flows in the flow passage 44, 144 is the ink. Since the fused material can be prevented from flowing into the flow passage for the ink to flow therein, the fused and solidified material can be prevented from mixing with the ink flowing in the flow passage and the ink can be prevented from leaking from the flow passage to an outside space.

In each of the illustrated embodiments, the flow passage 44, 144 is the ink supply passage which supplies the ink to the ink jet recording head 63 having the nozzles 55 each of which ejects a droplet of the ink toward the recording medium 62. Thus, the designed, cross-section area of the flow passage 44, 144 can be kept intact, and accordingly the desired flow amount of the ink can be assured. In addition, since foreign matters can be prevented from mixing with the ink flowing in the flow passage, the ink jet recording head can enjoy improved quality and reliability.

In applicable ones of the illustrated embodiments, one of the first and second members 34, 35; 134, 135 includes the weldable portion 36, 136 and the first projecting portion 37, 137, and the other of the first and second members includes, at a position aligned with the weldable portion, the third projecting portion 90 (90e, 90f) which projects from the surface 20 thereof opposed to the above-indicated one of the first and second members, toward the weldable portion, such that an end surface of the third projecting portion is located at the first position, and the third projecting portion has the inner side surface 93 (93e, 93f) which is opposed to the outer side surface 92 (92e, 92f) of the first projecting portion 37, 137 and is nearer to the outer side surface of the first projecting portion than to the inner side surface 91 (91e, 91f) of the weldable portion that is opposed to the outer side surface of the first projecting portion. Since the inner side surface of the third projecting portion is opposed to the outer side surface of the first projecting portion and is nearer to the latter side surface than the side surface of the weldable portion, the first and third projecting portions can cooperate with each other to define a narrow gap having a high resistance to the flowing of the fused material. Therefore, when the weldable portion 36, 136 is welded, the fused material flowing from the weldable portion can be effectively prevented from flowing into the flow passage 44, 144 via the gap left between the first and third projecting portions.

In applicable ones of the illustrated embodiments, one of the first and second members 34, 35; 134, 135 includes the weldable portion 36, 136 and the first projecting portion 37, 137 which project toward the other of the first and second members such that the first projecting portion is longer than the weldable portion. Thus, the weldable portion can be protected by the first projecting portion and can be prevented from colliding with foreign matters and being damaged by the same when the first and second members are transported before being welded to each other. Thus, the end portion of the weldable portion can be easily kept intact and can be prevented from being defectively welded.

In applicable ones of the illustrated embodiments, one of the first and second members 34, 35; 134, 135 includes the weldable portion 36, 136 and the second projecting portion 38, 138 which project toward the other of the first and second members such that the second projecting portion is longer than the weldable portion. Thus, the weldable portion can be protected by the second projecting portion and can be prevented from colliding with foreign matters and being damaged by the same when the first and second members are transported before being welded to each other. Thus, the end portion of the weldable portion can be easily kept intact and can be prevented from being defectively welded.

It is to be understood that the present invention may be embodied with various changes and improvements that may occur to a person skilled in the art, without departing from the spirit and scope of the invention defined in the appended claims.

What is claimed is:

1. A joint structure, comprising: a first member and a second member which are jointed to each other to define a flow passage in which a fluid flows; at least one of the first and second members including a weldable portion which projects toward an opposed surface of an other of the first and second members in a first direction and whose end portion is fused and welded to the opposed surface, so as to joint the first and second members to each other at a first position in the first direction; and at least one of the first and second members including a first projecting portion which is provided between the weldable portion and the flow passage in a second direction perpendicular to the first direction, and projects toward an other of the first and second members such that a free end of the first projecting portion is located at a second position different from the first position in the first direction, while the first projecting portion cooperates with the weldable portion to define a first space therebetween in the second direction.

2. The joint structure according to claim 1, wherein a volume of the first space is greater than a volume of the fused portion of the weldable portion.

3. The joint structure according to claim 1, wherein at least one of the first and second members includes a second projecting portion which is provided on an opposite side of the weldable portion from the flow passage in the second direction, and projects toward an other of the first and second members such that a free end of the second projecting portion is located at a third position different from the first position in the first direction, while the second projecting portion cooperates with the weldable portion to define a second space therebetween in the second direction.

4. The joint structure according to claim 3, wherein a sum of respective volumes of the first and second spaces is greater than a volume of the fused portion of the weldable portion.

5. The joint structure according to claim 3, wherein one of the first and second members includes the weldable portion and the second projecting portion which project toward an other of the first and second members such that the second projecting portion is longer than the weldable portion.

6. The joint structure according to claim 1, wherein one of the first and second members includes the weldable portion and the first projecting portion which project toward an other of the first and second members such that the first projecting portion is longer than the weldable portion, and wherein said other of the first and second members has, at a position aligned with the first projecting portion in the second direction, a first-projecting-portion receiving recessed portion which receives an end portion of the first projecting portion.

7. The joint structure according to claim 6, wherein the end portion of the first projecting portion includes a protruding portion which is opposed to an inner bottom surface of the first-projecting-portion receiving recessed portion and protrudes toward the inner bottom surface.

8. The joint structure according to claim 1, wherein one of the first and second members includes the weldable portion and an other of the first and second members has, at a position aligned with the weldable portion in the second direction, a weldable-portion receiving recessed portion which receives the end portion of the weldable portion.

9. The joint structure according to claim 1, wherein each of the first and second members is formed of a resin, and wherein the weldable portion is fused, by supersonic welding, to the opposed surface so as to joint the first and second members to each other.

10. The joint structure according to claim 1, wherein the fluid comprises an ink.

11. The joint structure according to claim 10, wherein the flow passage comprises an ink supply passage which supplies the ink to an ink jet recording head having a plurality of ink ejection nozzles each of which ejects a droplet of the ink toward a recording medium.

12. The joint structure according to claim 1, wherein one of the first and second members includes the weldable portion and the first projecting portion, and an other of the first and second members includes, at a position aligned with the weldable portion in the second direction, a third projecting portion which projects toward the weldable portion such that an end surface of the third projecting portion is located at the first position, and wherein the third projecting portion has a side surface which is opposed to a side surface of the first projecting portion and is nearer to the side surface of the first projecting portion than to a side surface of the weldable portion that is opposed to the side surface of the first projecting portion.

13. The joint structure according to claim 1, wherein one of the first and second members includes the weldable portion and the first projecting portion which project toward other of the first and second members such that the first projecting portion is longer than the weldable portion.

14. The joint structure according to claim 1, wherein the first projecting portion has a shape which surrounds the flow passage.

15. The joint structure according to claim 14, wherein the weldable portion has a shape which surrounds the flow passage.

16. A joint structure, comprising: a first member and a second member which are jointed to each other to define a flow passage in which a fluid flows; at least one of the first and second members including a weldable portion which projects from a first opposed surface thereof toward a second opposed surface of an other of the first and second members in a first direction and whose end portion is fused and welded to the second opposed surface so as to joint the first and second members to each other; and at least one of the first and second members including a flow preventing portion which prevents a flow of the fused portion of the weldable portion into the fluid passage, and which is provided between the weldable portion and the flow passage in a second direction perpendicular to the first direction, such that the flow preventing portion cooperates with the weldable portion and the first and second opposed surfaces to define a fused-portion trapping space to trap the fused portion of the weldable portion, and is provided between the first and second opposed surfaces in the first direction such that a lower end of the flow preventing portion is not higher than a lower one of the first and second opposed surfaces.

17. The joint structure according to claim 16, wherein one of the first and second members includes the flow preventing portion, and an other of the first and second members has a flow-preventing-portion receiving recessed portion which receives an end portion of the flow preventing portion, so as to substantially close the fused-portion trapping space and thereby trap the fused portion in the fused-portion trapping space.

18. The joint structure according to claim 17, wherein the flow preventing portion and the flow-preventing-portion receiving recessed portion cooperate with each other to define a gap which communicates with the fused-portion trapping space and has a flow resistance which does not allow the flow of the fused portion therethrough into the flow passage.

19. The joint structure according to claim 16, wherein the weldable portion projects downward from an upper one of the first and second opposed surfaces toward the lower opposed surface, and the flow preventing portion projects upward from the lower opposed surface toward the upper opposed surface and prevents the flow of the fused portion on, and along, the lower opposed surface into the flow passage.

20. The joint structure according to claim 19, wherein an upper end of the flow preventing portion is higher than the lower opposed surface to which the weldable portion is welded.

21. The joint structure according to claim 16, wherein the flow preventing portion has a shape which surrounds the flow passage.

22. The joint structure according to claim 21, wherein the weldable portion has a shape which surrounds the flow passage.

23. A joint structure, comprising: a first member and a second member which are jointed to each other to define a flow passage in which a fluid flows; at least one of the first and second members including a weldable portion which projects toward an other of the first and second members and whose end portion is fused and welded to said other member; and the first and second members including a first and a second flow preventing portion, respectively, which cooperate with each other to substantially close a fused-portion trapping space which is provided between the weldable portion and the flow passage and which traps the fused portion of the weldable portion so as to prevent a flow of the fused portion into the fluid passage, the first and second flow preventing portions having respective shapes which allow, in a state in which the fused-portion trapping space is substantially closed, a relative movement of the first and second members toward each other.

24. The joint structure according to claim 23, wherein the first and second flow preventing portions cooperate with each other to define a gap which communicates with the fused-portion trapping space and has a flow resistance which does not allow the flow of the fused portion therethrough into the flow passage.

* * * * *